United States Patent
Burnett

(10) Patent No.: US 9,677,353 B2
(45) Date of Patent: Jun. 13, 2017

(54) SHALE SHAKERS WITH SELECTIVE SERIES/PARALLEL FLOW PATH CONVERSION

(71) Applicant: National Oilwell Varco, L.P., Houston, TX (US)

(72) Inventor: George Alexander Burnett, Aberdeenshire (GB)

(73) Assignee: National Oilwell Varco, L.P., Houston, TX (US)

(*) Notice: Subject to any disclaimer, the term of this patent is extended or adjusted under 35 U.S.C. 154(b) by 431 days.

(21) Appl. No.: 14/019,228

(22) Filed: Sep. 5, 2013

(65) Prior Publication Data

US 2014/0021120 A1    Jan. 23, 2014

Related U.S. Application Data

(60) Division of application No. 12/490,492, filed on Jun. 24, 2009, now Pat. No. 8,556,083, which is a continuation-in-part of application No. 12/287,709, filed on Oct. 10, 2008, now Pat. No. 8,113,356.

(51) Int. Cl.
| | | |
|---|---|---|
| *B07B 1/28* | (2006.01) | |
| *E21B 21/06* | (2006.01) | |
| *B01D 33/03* | (2006.01) | |
| *B07B 1/46* | (2006.01) | |

(Continued)

(52) U.S. Cl.
CPC ........ *E21B 21/065* (2013.01); *B01D 33/0376* (2013.01); *B07B 1/28* (2013.01); *B07B 1/46* (2013.01); *B07B 13/16* (2013.01); *B07B 13/18* (2013.01); *B07B 2201/04* (2013.01); *B07B 2230/01* (2013.01)

(58) Field of Classification Search
CPC .. B07B 1/28; B07B 1/46; B07B 13/16; B07B 13/18; B07B 2201/04; B07B 2230/01; B01D 33/0376; B01D 33/35; B01D 33/37; B01D 33/41; E21B 21/06; E21B 21/063; E21B 21/065
USPC ................. 209/311, 314, 315, 360, 240–266
See application file for complete search history.

(56) References Cited

U.S. PATENT DOCUMENTS

| | | | |
|---|---|---|---|
| 399,616 A | 3/1889 | Riddle | ........................ 209/238 |
| 485,488 A | 11/1892 | Cockrell | ...................... 209/401 |
| 1,078,380 A | 11/1913 | Reynolds | |

(Continued)

FOREIGN PATENT DOCUMENTS

| | | |
|---|---|---|
| DE | 4127929 A1 | 2/1993 |
| FR | 2 611 559 | 9/1988 |

(Continued)

OTHER PUBLICATIONS

U.S. Appl. No. 12/785,735 Office Action dated Dec. 9, 2011.

(Continued)

*Primary Examiner* — Joseph C Rodriguez
*Assistant Examiner* — Kalyanavenkateshware Kumar
(74) *Attorney, Agent, or Firm* — Amerson Law Firm, PLLC

(57) ABSTRACT

Methods and systems are disclosed employing a shale shaker for processing a mixture of drilling fluid and solids with multiple screen assemblies and conversion apparatus for switching flow to the screen assemblies between series flow and parallel flow; and in one aspect, a screen or screens for screening lost circulation material.

25 Claims, 28 Drawing Sheets

(51) Int. Cl.
*B07B 13/16* (2006.01)
*B07B 13/18* (2006.01)

(56) References Cited

U.S. PATENT DOCUMENTS

| | | | |
|---|---|---|---|
| 1,139,469 A | 5/1915 | Potter | 209/401 |
| 1,304,918 A | 5/1919 | Sweetland | |
| 1,459,845 A | 6/1923 | Mitchell | |
| 1,830,792 A | 11/1931 | Herrmann | 209/401 |
| 1,885,154 A | 11/1932 | Strezynski et al. | |
| 1,886,174 A | 11/1932 | Hazeltine | 209/269 |
| 1,997,713 A | 4/1935 | Boehm | 298/401 |
| 2,082,513 A | 6/1937 | Roberts | 210/76 |
| 2,089,548 A | 8/1937 | Frantz et al. | 210/389 |
| 2,112,784 A | 3/1938 | McNitt | 99/105 |
| 2,341,169 A | 2/1944 | Wison et al. | 73/51 |
| 2,418,529 A | 4/1947 | Stern | 51/309 |
| 2,578,456 A | 12/1951 | Smith | 233/7 |
| 2,653,521 A | 9/1953 | Einarsson | 209/70 |
| 2,711,854 A | 6/1955 | Kjellgren | 494/53 |
| 2,716,493 A | 8/1955 | Hutchison | 209/269 X |
| 2,750,043 A | 6/1956 | Thompson | 210/149 |
| 2,895,669 A | 7/1959 | Bobo | 494/10 |
| 2,919,898 A | 1/1960 | Marwil et al. | 255/1.8 |
| 2,926,785 A | 3/1960 | Sander | 209/401 |
| 2,928,546 A | 3/1960 | Church | 210/319 |
| 2,938,393 A | 5/1960 | Dunn et al. | 74/61 |
| 2,942,731 A | 6/1960 | Soldini | 209/293 |
| 2,955,753 A | 10/1960 | O'Conor et al. | 494/5 |
| 2,961,154 A | 11/1960 | Bergey | 494/1 |
| 2,973,865 A | 5/1961 | Cibula | 209/315 |
| 3,012,674 A | 12/1961 | Hoppe | 209/401 |
| 3,053,379 A | 9/1962 | Roder et al. | 198/220 |
| 3,064,806 A | 11/1962 | Tapani | 209/17 |
| 3,070,291 A | 12/1962 | Bergey | 494/1 |
| 3,219,107 A | 11/1965 | Brown et al. | 166/8 |
| 3,226,989 A | 1/1966 | Robins | 74/87 |
| 3,268,159 A | 8/1966 | Kern | 233/7 |
| 3,302,720 A | 2/1967 | Brandon | 166/42 |
| 3,498,393 A | 3/1970 | West et al. | 175/48 |
| 3,605,919 A | 9/1971 | Bromell et al. | 175/27 |
| 3,629,859 A | 12/1971 | Copland et al. | 340/172.5 |
| 3,640,344 A | 2/1972 | Brandon | 166/307 |
| 3,659,465 A | 5/1972 | Oshima et al. | 74/61 |
| 3,716,138 A | 2/1973 | Lumsden | 209/401 |
| 3,726,136 A | 4/1973 | McKean et al. | 73/155 |
| 3,795,361 A | 3/1974 | Lee | 233/7 |
| 3,796,299 A | 3/1974 | Musschoot | 198/220 |
| 3,855,380 A | 12/1974 | Gordon et al. | 264/97 |
| 3,874,733 A | 4/1975 | Poundstone et al. | 299/17 |
| 3,885,734 A | 5/1975 | Lee | 233/3 |
| 3,900,393 A | 8/1975 | Wilson | 209/399 |
| 3,934,792 A | 1/1976 | High et al. | 233/7 |
| 3,955,411 A | 5/1976 | Lawson, Jr. | 73/155 |
| 3,968,033 A | 7/1976 | Illemann et al. | 209/403 |
| 3,993,146 A | 11/1976 | Poundstone et al. | 175/206 |
| 4,000,074 A | 12/1976 | Evans | 210/369 |
| 4,033,865 A | 7/1977 | Derrick, Jr. | 209/275 |
| 4,038,152 A | 7/1977 | Atkins | 201/2.5 |
| 4,082,657 A | 4/1978 | Gage | 209/311 |
| 4,085,888 A | 4/1978 | Jager | 233/7 |
| 4,115,507 A | 9/1978 | Pico et al. | 264/267 |
| 4,116,288 A | 9/1978 | Love | 175/66 |
| 4,192,743 A | 3/1980 | Bastgen et al. | 210/712 |
| 4,208,906 A | 6/1980 | Roberts, Jr. | 73/155 |
| 4,212,731 A | 7/1980 | Wallin et al. | 209/366.5 |
| 4,222,988 A | 9/1980 | Barthel | 422/309 |
| 4,224,821 A | 9/1980 | Taylor et al. | 73/32 R |
| 4,228,949 A | 10/1980 | Jackson | 233/7 |
| 4,233,181 A | 11/1980 | Goller et al. | 252/425.3 |
| 4,240,578 A | 12/1980 | Jackson | 233/7 |
| 4,297,225 A | 10/1981 | Hartley | 210/779 |
| 4,298,160 A | 11/1981 | Jackson | 233/7 |
| 4,298,162 A | 11/1981 | Hohne | 233/7 |
| 4,298,572 A | 11/1981 | Moffet et al. | 422/68 |
| 4,306,974 A | 12/1981 | Harry | 210/388 |
| 4,319,482 A | 3/1982 | Bunner | 73/153 |
| 4,319,991 A | 3/1982 | Crone, Jr. et al. | 209/255 |
| 4,322,288 A | 3/1982 | Schmidt | 209/356 |
| 4,339,072 A | 7/1982 | Hiller | 233/7 |
| 4,350,591 A | 9/1982 | Lee | 210/384 |
| 4,369,915 A | 1/1983 | Oberg et al. | 494/8 |
| 4,378,906 A | 4/1983 | Epper et al. | 494/54 |
| 4,380,494 A | 4/1983 | Wilson | 290/319 |
| 4,411,074 A | 10/1983 | Daly | 34/32 |
| 4,432,064 A | 2/1984 | Barker et al. | 364/550 |
| 4,446,022 A | 5/1984 | Harry | 210/388 |
| 4,459,207 A | 7/1984 | Young | 209/269 |
| 4,482,459 A | 11/1984 | Shiver | 210/639 |
| 4,491,517 A | 1/1985 | Janovac | 209/401 |
| 4,495,065 A | 1/1985 | DeReamer et al. | 209/243 |
| 4,526,687 A | 7/1985 | Nugent | 210/202 |
| 4,536,286 A | 8/1985 | Nugent | 210/202 |
| 4,546,783 A | 10/1985 | Lott | 134/109 |
| 4,549,431 A | 10/1985 | Soeiinah | 73/152.49 |
| 4,553,429 A | 11/1985 | Evans et al. | 73/152.21 |
| 4,573,115 A | 2/1986 | Halgrimson | 364/138 |
| 4,575,336 A | 3/1986 | Mudd et al. | 432/72 |
| 4,575,421 A | 3/1986 | Derrick et al. | 298/397 |
| 4,606,415 A | 8/1986 | Gray, Jr. et al. | 175/24 |
| 4,624,417 A | 11/1986 | Gangi | 241/17 |
| 4,634,535 A | 1/1987 | Lott | 210/780 |
| 4,635,735 A | 1/1987 | Crownover | 175/48 |
| 4,639,258 A | 1/1987 | Schellstede et al. | 95/260 |
| 4,650,687 A | 3/1987 | Willard et al. | 426/438 |
| 4,668,213 A | 5/1987 | Kramer | 494/8 |
| 4,685,329 A | 8/1987 | Burgess | 73/151 |
| 4,691,744 A | 9/1987 | Haver et al. | 139/425 R |
| 4,696,353 A | 9/1987 | Elmquist et al. | 175/206 |
| 4,696,751 A | 9/1987 | Eifling | 210/780 |
| 4,729,548 A | 3/1988 | Sullins | 266/44 |
| 4,743,226 A | 5/1988 | Day et al. | 494/53 |
| 4,751,887 A | 6/1988 | Terry et al. | 110/246 |
| 4,770,711 A | 9/1988 | Deal, III et al. | 134/18 |
| 4,783,057 A | 11/1988 | Sullins | 266/44 |
| 4,791,002 A | 12/1988 | Baker et al. | 426/641 |
| 4,793,421 A | 12/1988 | Jasinski | 175/27 |
| 4,795,552 A | 1/1989 | Yun et al. | 209/319 |
| 4,799,987 A | 1/1989 | Sullins | 156/425 |
| 4,805,659 A | 2/1989 | Gunnewig et al. | 137/118 |
| 4,807,469 A | 2/1989 | Hall | 73/155 |
| 4,809,791 A | 3/1989 | Hayatdavoudi | 175/40 |
| 4,832,853 A | 5/1989 | Shiraki et al. | 210/781 |
| 4,844,106 A | 7/1989 | Hunter et al. | 134/73 |
| 4,846,352 A | 7/1989 | Bailey | 209/399 |
| 4,857,176 A | 8/1989 | Derrick et al. | 209/392 |
| 4,882,054 A | 11/1989 | Derrick et al. | 210/389 |
| 4,889,733 A | 12/1989 | Willard et al. | 426/438 |
| 4,889,737 A | 12/1989 | Willard et al. | 426/550 |
| 4,895,665 A | 1/1990 | Colelli et al. | 210/710 |
| 4,895,731 A | 1/1990 | Baker et al. | 426/641 |
| 4,896,835 A | 1/1990 | Fahrenholz | 241/74 |
| 4,911,834 A | 3/1990 | Murphy | 210/167 |
| 4,915,452 A | 4/1990 | Dibble | 299/17 |
| 4,940,535 A | 7/1990 | Fisher et al. | 209/250 |
| 4,942,929 A | 7/1990 | Malachosky et al. | 175/66 |
| 4,961,722 A | 10/1990 | Taylor et al. | 494/36 |
| 5,010,966 A | 4/1991 | Stokley et al. | 175/66 |
| 5,053,082 A | 10/1991 | Flanigan et al. | 134/25.1 |
| 5,066,350 A | 11/1991 | Sullins | 156/187 |
| 5,080,721 A | 1/1992 | Flanigan et al. | 134/26 |
| 5,107,874 A | 4/1992 | Flanigan et al. | 134/60 |
| 5,109,933 A | 5/1992 | Jackson | 175/66 |
| 5,129,469 A | 7/1992 | Jackson | 175/66 |
| 5,131,271 A | 7/1992 | Haynes et al. | 73/290 |
| 5,145,256 A | 9/1992 | Wiemers et al. | 366/336 |
| 5,147,277 A | 9/1992 | Shapiro | 494/53 |
| 5,156,749 A | 10/1992 | Williams | 210/770 |
| 5,156,751 A | 10/1992 | Miller | 210/787 |
| 5,181,578 A | 1/1993 | Lawler | 175/424 |
| 5,190,645 A | 3/1993 | Burgess | 210/144 |
| 5,200,372 A | 4/1993 | Kuroyama et al. | 501/96 |
| 5,203,762 A | 4/1993 | Cooperstein | 494/7 |
| 5,221,008 A | 6/1993 | Derrick, Jr. et al. | 209/269 |

(56) References Cited

U.S. PATENT DOCUMENTS

| | | | |
|---|---|---|---|
| 5,226,546 A | 7/1993 | Janssens et al. | 209/319 |
| 5,227,057 A | 7/1993 | Lundquist | 210/174 |
| 5,229,018 A | 7/1993 | Forrest | 252/8.551 |
| 5,232,099 A | 8/1993 | Maynard | 209/311 |
| 5,253,718 A | 10/1993 | Lawler | 175/20 |
| 5,256,291 A | 10/1993 | Cagle | 210/499 |
| 5,265,730 A | 11/1993 | Norris et al. | 209/326 |
| 5,273,112 A | 12/1993 | Schultz | 166/374 |
| 5,278,549 A | 1/1994 | Crawford | 340/853.2 |
| 5,314,058 A | 5/1994 | Graham | 198/753 |
| 5,319,972 A | 6/1994 | Oblak et al. | 73/290 |
| 5,329,465 A | 7/1994 | Arcella et al. | 364/551.01 |
| 5,330,057 A | 7/1994 | Schiller et al. | 209/392 |
| 5,332,101 A | 7/1994 | Bakula | 209/403 |
| 5,337,966 A | 8/1994 | Francis et al. | 241/46.06 |
| 5,370,797 A | 12/1994 | Cagle | 210/499 |
| 5,378,364 A | 1/1995 | Welling | 210/512.1 |
| 5,385,669 A | 1/1995 | Leone, Sr. | 210/488 |
| 5,392,925 A | 2/1995 | Seyffert | 209/405 |
| 5,400,376 A | 3/1995 | Trudeau | 377/21 |
| 5,403,260 A | 4/1995 | Hensley | 494/53 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| 5,454,957 A | 10/1995 | Roff | 210/768 |
| 5,465,798 A | 11/1995 | Edlund et al. | 175/24 |
| 5,474,142 A | 12/1995 | Bowden | 175/27 |
| 5,488,104 A | 1/1996 | Schulz | 536/86 |
| 5,489,204 A | 2/1996 | Conwell et al. | 432/153 |
| 5,494,584 A | 2/1996 | McLachlan et al. | 210/739 |
| 5,516,348 A | 5/1996 | Conwell et al. | 51/309 |
| 5,534,207 A | 7/1996 | Burrus | 264/150 |
| 5,547,479 A | 8/1996 | Conwell et al. | 51/309 |
| 5,566,889 A | 10/1996 | Preiss | 241/19 |
| 5,567,150 A | 10/1996 | Conwell et al. | 432/14 |
| 5,570,749 A | 11/1996 | Reed | 175/66 |
| 5,593,582 A | 1/1997 | Roff, Jr. | 210/325 |
| 5,597,042 A | 1/1997 | Tubel et al. | 166/250.01 |
| 5,626,234 A | 5/1997 | Cook et al. | 209/315 |
| 5,632,714 A | 5/1997 | Leung et al. | 494/53 |
| 5,636,749 A | 6/1997 | Wojciechowski | 209/403 |
| 5,638,960 A | 6/1997 | Beuermann et al. | 209/397 |
| 5,641,070 A | 6/1997 | Seyffert | 209/314 |
| 5,643,169 A | 7/1997 | Leung et al. | 494/53 |
| 5,653,674 A | 8/1997 | Leung | 494/53 |
| 5,662,165 A | 9/1997 | Tubel et al. | 166/250.01 |
| 5,669,941 A | 9/1997 | Peterson | 51/295 |
| 5,681,256 A | 10/1997 | Nagafuji | 494/9 |
| D386,874 S | 11/1997 | Glaun | D34/29 |
| D387,534 S | 12/1997 | Glaun | D34/29 |
| D388,583 S | 12/1997 | Glaun | D34/29 |
| 5,695,442 A | 12/1997 | Leung et al. | 494/37 |
| 5,699,918 A | 12/1997 | Dunn | 209/397 |
| D388,924 S | 1/1998 | Glaun | D34/29 |
| 5,706,896 A | 1/1998 | Tubel et al. | 166/313 |
| 5,720,881 A | 2/1998 | Derrick et al. | 210/388 |
| 5,730,219 A | 3/1998 | Tubel et al. | 166/250.01 |
| 5,732,776 A | 3/1998 | Tubel et al. | 166/250.15 |
| 5,732,828 A | 3/1998 | Littlefield, Jr. | 209/365.1 |
| 5,771,601 A | 6/1998 | Veal et al. | 34/314 |
| 5,772,573 A | 6/1998 | Hao | 494/15 |
| 5,783,077 A | 7/1998 | Bakula | 210/388 |
| 5,791,494 A | 8/1998 | Meyer | 209/368 |
| 5,793,705 A | 8/1998 | Gazis et al. | 367/98 |
| 5,811,003 A | 9/1998 | Young et al. | 210/388 |
| 5,814,218 A | 9/1998 | Cagle | 210/388 |
| 5,814,230 A | 9/1998 | Willis et al. | 210/710 |
| 5,816,413 A | 10/1998 | Boccabella et al. | 209/399 |
| 5,819,952 A | 10/1998 | Cook et al. | 209/400 |
| 5,839,521 A | 11/1998 | Reddoch | 100/37 |
| 5,857,955 A | 1/1999 | Phillips | 494/7 |
| 5,861,362 A | 1/1999 | Mayeux et al. | 507/104 |
| 5,868,125 A | 2/1999 | Maoujoud | 125/15 |
| 5,868,929 A | 2/1999 | Derrick et al. | 210/388 |
| 5,876,552 A | 3/1999 | Bakula | 156/308 |
| 5,896,998 A | 4/1999 | Bjorklund et al. | 209/326 |
| 5,899,844 A | 5/1999 | Eberle, Sr. | 494/37 |
| 5,913,767 A | 6/1999 | Feldkamp et al. | 494/4 |
| 5,919,123 A | 7/1999 | Phillips | 494/7 |
| 5,942,130 A | 8/1999 | Leung | 210/784 |
| 5,944,197 A | 8/1999 | Baltzer et al. | 209/400 |
| 5,944,993 A | 8/1999 | Derrick et al. | 210/388 |
| 5,948,256 A | 9/1999 | Leung | 210/374 |
| 5,948,271 A | 9/1999 | Wardwell et al. | 210/739 |
| 5,952,569 A | 9/1999 | Jervis et al. | 73/152.01 |
| 5,955,666 A | 9/1999 | Mullins | 73/152.18 |
| 5,958,235 A | 9/1999 | Leung | 210/374 |
| 5,958,236 A | 9/1999 | Bakula | 210/388 |
| 5,971,159 A | 10/1999 | Leone et al. | 209/399 |
| 5,971,307 A | 10/1999 | Davenport | 241/259.1 |
| 5,975,204 A | 11/1999 | Tubel et al. | 166/250.15 |
| 5,992,519 A | 11/1999 | Ramakrishnan et al. | 166/250.15 |
| 6,000,556 A | 12/1999 | Bakula | 210/388 |
| 6,012,016 A | 1/2000 | Bilden et al. | 702/12 |
| 6,013,158 A | 1/2000 | Wootten | 202/99 |
| 6,021,377 A | 2/2000 | Dubinsky et al. | 702/9 |
| 6,024,228 A | 2/2000 | Williams | 209/272 |
| 6,032,806 A | 3/2000 | Leone et al. | 209/402 |
| 6,045,070 A | 4/2000 | Davenport | 241/60 |
| 6,053,332 A | 4/2000 | Bakula | 210/388 |
| 6,062,070 A | 5/2000 | Maltby et al. | 73/61.49 |
| 6,063,292 A | 5/2000 | Leung | 210/739 |
| 6,089,380 A | 7/2000 | Hazrati et al. | 210/411 |
| 6,102,310 A | 8/2000 | Davenport | 241/21 |
| 6,105,689 A | 8/2000 | McGuire et al. | 175/48 |
| 6,109,452 A | 8/2000 | Leung et al. | 210/369 |
| 6,110,096 A | 8/2000 | Leung et al. | 494/53 |
| 6,123,656 A | 9/2000 | Michelsen | 494/54 |
| 6,138,834 A | 10/2000 | Southall | 209/17 |
| 6,143,183 A | 11/2000 | Wardwell et al. | 210/739 |
| 6,145,669 A | 11/2000 | Leung | 210/374 |
| 6,155,428 A | 12/2000 | Bailey et al. | 209/315 |
| 6,161,700 A | 12/2000 | Bakula | 209/401 |
| 6,165,323 A | 12/2000 | Shearer | 162/251 |
| 6,170,580 B1 | 1/2001 | Reddoch | 175/66 |
| 6,173,609 B1 | 1/2001 | Modlin et al. | 73/293 |
| 6,176,323 B1 | 1/2001 | Weirich et al. | 175/40 |
| 6,179,128 B1 | 1/2001 | Seyffert | 209/405 |
| 6,192,742 B1 | 2/2001 | Miwa et al. | 73/40 |
| 6,192,980 B1 | 2/2001 | Tubel et al. | 166/65.1 |
| 6,217,830 B1 | 4/2001 | Roberts et al. | 422/140 |
| 6,220,448 B1 | 4/2001 | Bakula et al. | 209/392 |
| 6,220,449 B1 | 4/2001 | Schulte, Jr. et al. | 209/401 |
| 6,223,906 B1 | 5/2001 | Williams | 210/400 |
| 6,233,524 B1 | 5/2001 | Harrell et al. | 702/9 |
| 6,234,250 B1 | 5/2001 | Green et al. | 166/250.03 |
| 6,237,404 B1 | 5/2001 | Crary et al. | 73/152.03 |
| 6,237,780 B1 | 5/2001 | Schulte | 210/388 |
| 6,267,250 B1 | 7/2001 | Leung et al. | 210/369 |
| 6,279,471 B1 | 8/2001 | Reddoch | 100/37 |
| D448,488 S | 9/2001 | Chaffiotte et al. | D24/219 |
| 6,283,302 B1 | 9/2001 | Schulte et al. | 209/399 |
| 6,290,636 B1 | 9/2001 | Hiller, Jr. et al. | 494/53 |
| 6,308,787 B1 | 10/2001 | Alft | 175/48 |
| 6,315,894 B1 | 11/2001 | Wiemers et al. | 210/96.1 |
| 6,333,700 B1 | 12/2001 | Thomeer et al. | 340/854.8 |
| 6,346,813 B1 | 2/2002 | Kleinberg | 324/303 |
| 6,349,834 B1 | 2/2002 | Carr et al. | 209/366.5 |
| 6,352,159 B1 | 3/2002 | Loshe | 209/268 |
| 6,356,205 B1 | 3/2002 | Salvo et al. | 340/853.3 |
| 6,367,633 B1 | 4/2002 | Douglas | 209/311 |
| 6,368,264 B1 | 4/2002 | Phillips et al. | 494/5 |
| 6,371,301 B1 | 4/2002 | Schulte et al. | 209/405 |
| 6,371,306 B2 | 4/2002 | Adams et al. | 320/388 |
| 6,378,628 B1 | 4/2002 | McGuire et al. | 175/48 |
| 6,393,363 B1 | 5/2002 | Wilt et al. | 702/6 |
| 6,399,851 B1 | 6/2002 | Siddle | 203/87 |
| 6,408,953 B1 | 6/2002 | Goldman et al. | 175/39 |
| 6,412,644 B1 | 7/2002 | Crabbe et al. | 209/309 |
| 6,429,653 B1 | 8/2002 | Kruspe et al. | 324/303 |
| 6,431,368 B1 | 8/2002 | Carr | 209/403 |
| 6,438,495 B1 | 8/2002 | Chau et al. | 702/9 |
| 6,439,391 B1 | 8/2002 | Seyffert | 209/238 |

(56) References Cited

U.S. PATENT DOCUMENTS

| | | | |
|---|---|---|---|
| 6,439,392 B1 | 8/2002 | Baltzer | 209/405 |
| 6,461,286 B1 | 10/2002 | Beattey | 494/8 |
| 6,474,143 B1 | 11/2002 | Herod | 73/54.01 |
| 6,484,088 B1 | 11/2002 | Reimer | 701/123 |
| 6,485,640 B2 | 11/2002 | Fout et al. | 210/188 |
| 6,505,682 B2 | 1/2003 | Brockman | 166/250.15 |
| 6,506,310 B2 | 1/2003 | Kulbeth | 210/780 |
| 6,510,947 B1 | 1/2003 | Schulte et al. | 210/388 |
| 6,513,664 B1 | 2/2003 | Logan et al. | 209/367 |
| 6,517,733 B1 | 2/2003 | Carlson | 210/785 |
| 6,519,568 B1 | 2/2003 | Harvey et al. | 705/1 |
| 6,530,482 B1 | 3/2003 | Wiseman | 209/253 |
| 6,536,540 B2 | 3/2003 | deBoer | 175/70 |
| 6,553,316 B2 | 4/2003 | Bary et al. | 702/16 |
| 6,553,336 B1 | 4/2003 | Johnson et al. | 702/188 |
| 6,575,304 B2 | 6/2003 | Cudahy | 209/365.3 |
| 6,581,455 B1 | 6/2003 | Berger et al. | 73/152.55 |
| 6,600,278 B1 | 7/2003 | Bretzius | 318/34 |
| 6,601,709 B2 | 8/2003 | Schulte et al. | 209/397 |
| 6,605,029 B1 | 8/2003 | Koch et al. | 494/53 |
| 6,662,952 B2 | 12/2003 | Adams et al. | 209/319 |
| 6,669,027 B1 | 12/2003 | Mooney et al. | 209/405 |
| 6,679,385 B2 | 1/2004 | Suter et al. | 209/367 |
| 6,691,025 B2 | 2/2004 | Reimer | 701/123 |
| 6,692,599 B2 | 2/2004 | Cook et al. | 156/94 |
| 6,693,553 B1 | 2/2004 | Ciglenec et al. | 340/853.1 |
| 6,715,612 B1 | 4/2004 | Krystof | 209/331 |
| 6,722,504 B2 | 4/2004 | Schulte et al. | 209/359 |
| 6,746,602 B2 | 6/2004 | Fout et al. | 210/188 |
| 6,763,605 B2 | 7/2004 | Reddoch | 34/58 |
| 6,766,254 B1 | 7/2004 | Bradford et al. | 702/9 |
| 6,769,550 B2 | 8/2004 | Burnett et al. | 209/399 |
| 6,780,147 B2 | 8/2004 | Koch et al. | 494/53 |
| 6,783,088 B1 | 8/2004 | Gillis et al. | 241/19 |
| 6,783,685 B2 | 8/2004 | Hwang | 210/690 |
| 6,790,169 B2 | 9/2004 | Koch et al. | 494/53 |
| 6,793,814 B2 | 9/2004 | Fout et al. | 210/188 |
| 6,808,626 B2 | 10/2004 | Kulbeth | 210/241 |
| 6,825,136 B2 | 11/2004 | Cook et al. | 442/6 |
| 6,827,223 B2 | 12/2004 | Colgrove et al. | 209/365.3 |
| 6,838,008 B2 | 1/2005 | Fout et al. | 210/780 |
| 6,860,845 B1 | 3/2005 | Miller et al. | 494/1 |
| 6,863,183 B2 | 3/2005 | Schulte et al. | 209/405 |
| 6,863,809 B2 | 3/2005 | Smith et al. | 210/202 |
| 6,868,920 B2 | 3/2005 | Hoteit et al. | 175/25 |
| 6,868,972 B2 | 3/2005 | Seyffert et al. | 209/254 |
| 6,873,267 B1 | 3/2005 | Tubel et al. | 340/853.3 |
| 6,892,812 B2 | 5/2005 | Niedermayr et al. | 166/250.15 |
| 6,896,055 B2 | 5/2005 | Koithan | 166/250.15 |
| 6,899,178 B2 | 5/2005 | Tubel | 166/313 |
| 6,905,452 B1 | 6/2005 | Kirsch | 494/8 |
| 6,907,375 B2 | 6/2005 | Guggari et al. | 702/113 |
| 6,926,101 B2 | 8/2005 | deBoer | 175/70 |
| 6,932,169 B2 | 8/2005 | Wylie et al. | 175/66 |
| 6,932,757 B2 | 8/2005 | Beattey | 494/55 |
| 6,971,982 B1 | 12/2005 | Kirsch | 494/8 |
| 6,981,940 B2 | 1/2006 | Rafferty | 494/7 |
| 7,001,324 B2 | 2/2006 | Hensley et al. | 494/53 |
| 7,018,326 B2 | 3/2006 | Koch et al. | 494/53 |
| 7,041,044 B2 | 5/2006 | Gilbert | 494/53 |
| D524,825 S | 7/2006 | Koch et al. | D15/21 |
| 7,093,678 B2 | 8/2006 | Risher et al. | 175/66 |
| 7,144,516 B2 | 12/2006 | Smith | 210/803 |
| 7,175,027 B2 | 2/2007 | Strong et al. | 209/405 |
| 7,195,084 B2 | 3/2007 | Burnett et al. | 175/66 |
| 7,198,156 B2 | 4/2007 | Schulte et al. | 209/309 |
| 7,216,767 B2 | 5/2007 | Schulte et al. | 209/309 |
| 7,216,768 B2 | 5/2007 | Fisher et al. | 209/399 |
| 7,228,971 B2 | 6/2007 | Mooney et al. | 209/396 |
| 7,264,125 B2 | 9/2007 | Lipa | 209/397 |
| 7,284,665 B2 | 10/2007 | Fuchs | 209/270 |
| 7,303,079 B2 | 12/2007 | Reid-Robertson et al. | 209/405 |
| 7,306,057 B2 | 12/2007 | Strong et al. | 175/66 |
| 7,316,321 B2 | 1/2008 | Robertson et al. | 209/400 |
| 7,337,860 B2 | 3/2008 | McIntyre | 175/66 |
| 7,373,996 B1 | 5/2008 | Martin et al. | 175/206 |
| 7,387,602 B1 | 6/2008 | Kirsch | 494/8 |
| 7,514,011 B2 | 4/2009 | Kulbeth | 210/780 |
| 7,540,837 B2 | 6/2009 | Scott et al. | 494/7 |
| 7,540,838 B2 | 6/2009 | Scott et al. | 494/7 |
| 7,581,569 B2 | 9/2009 | Beck | 139/425 R |
| 7,770,665 B2 | 8/2010 | Eia et al. | 175/66 |
| 2001/0032815 A1 | 10/2001 | Adams et al. | 210/388 |
| 2002/0000399 A1 | 1/2002 | Winkler et al. | 209/399 |
| 2002/0018399 A1 | 2/2002 | Schultz et al. | 361/81 |
| 2002/0033278 A1 | 3/2002 | Reddoch | 175/57 |
| 2002/0033358 A1 | 3/2002 | Bakula | 209/331 |
| 2002/0035551 A1 | 3/2002 | Sherwin et al. | 705/412 |
| 2002/0065698 A1 | 5/2002 | Schick et al. | 705/8 |
| 2002/0112888 A1 | 8/2002 | Leuchtenberg | 175/48 |
| 2002/0134709 A1 | 9/2002 | Riddle | 209/238 |
| 2003/0015351 A1 | 1/2003 | Goldman et al. | 175/39 |
| 2003/0038734 A1 | 2/2003 | Hirsch et al. | 340/853.1 |
| 2003/0109951 A1 | 6/2003 | Hsiung et al. | 700/108 |
| 2003/0220742 A1 | 11/2003 | Niedermayr et al. | 702/9 |
| 2004/0040746 A1 | 3/2004 | Niedermayr et al. | 175/38 |
| 2004/0051650 A1 | 3/2004 | Gonsoulin et al. | 340/853.1 |
| 2004/0156920 A1 | 8/2004 | Kane | 424/725 |
| 2004/0245155 A1 | 12/2004 | Strong et al. | 209/405 |
| 2005/0067327 A1 | 3/2005 | Adams et al. | 209/408 |
| 2005/0103689 A1 | 5/2005 | Schulte, Jr. et al. | 209/405 |
| 2005/0236305 A1 | 10/2005 | Schulte, Jr. et al. | 209/403 |
| 2005/0255186 A1 | 11/2005 | Hiraga | 425/542 |
| 2006/0019812 A1 | 1/2006 | Stalwick | 494/42 |
| 2006/0034988 A1 | 2/2006 | Bresnahan et al. | 426/502 |
| 2006/0081508 A1 | 4/2006 | Astleford et al. | 209/309 |
| 2006/0102390 A1 | 5/2006 | Burnett et al. | 175/66 |
| 2006/0105896 A1 | 5/2006 | Smith et al. | 494/7 |
| 2006/0144779 A1* | 7/2006 | Bailey | B01D 33/0338 210/330 |
| 2007/0108106 A1 | 5/2007 | Burnett | 209/325 |
| 2007/0131592 A1 | 6/2007 | Browne et al. | 209/399 |
| 2008/0078697 A1 | 4/2008 | Carr | 209/49 |
| 2008/0078702 A1 | 4/2008 | Carr et al. | 209/326 |
| 2008/0078704 A1 | 4/2008 | Carr et al. | 209/399 |
| 2008/0093269 A1 | 4/2008 | Timmerman et al. | 209/405 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0071878 A1 | 3/2009 | Bosse | 209/391 |
| 2009/0105059 A1 | 4/2009 | Dorry et al. | 494/37 |
| 2009/0178978 A1 | 7/2009 | Beebe et al. | 210/747 |
| 2009/0242466 A1 | 10/2009 | Burnett et al. | 209/555 |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0089802 A1 | 4/2010 | Burnett | 209/360 |
| 2010/0119570 A1 | 5/2010 | Potter et al. | 424/422 |
| 2010/0237024 A1 | 9/2010 | Carr et al. | 210/780 |

FOREIGN PATENT DOCUMENTS

| | | |
|---|---|---|
| FR | 2 636 669 | 3/1990 |
| GB | 1 526 663 | 9/1978 |
| GB | 2 030 482 A | 4/1980 |
| GB | 1 578 948 | 11/1980 |
| GB | 2 176 424 A | 12/1986 |
| GB | 2 327 442 A | 1/1999 |
| GB | 2 408 006 B | 4/2007 |
| JP | 55112761 | 8/1980 |
| JP | 59069268 | 4/1984 |
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |
| JP | 06063499 | 3/1994 |
| JP | 07304028 | 11/1995 |

(56) References Cited

FOREIGN PATENT DOCUMENTS

| JP | 08039428 | 2/1996 |
| --- | --- | --- |
| JP | 08270355 | 10/1996 |
| JP | 09109032 | 4/1997 |
| JP | 10337598 | 12/1998 |
| WO | WO96/08301 | 3/1996 |
| WO | WO96/33792 | 3/1996 |
| WO | WO98/10895 | 3/1998 |
| WO | WO98/16328 | 3/1998 |
| WO | WO02/49778 | 6/2002 |
| WO | WO03/055569 | 7/2003 |
| WO | WO2004/110589 A1 | 12/2004 |
| WO | 2005070565 A2 | 8/2005 |
| WO | WO2005/107963 A2 | 11/2005 |
| WO | WO2007/070559 A2 | 6/2007 |
| WO | WO2008/042844 A1 | 4/2008 |
| WO | WO2009/048783 A2 | 4/2009 |

OTHER PUBLICATIONS

U.S. Appl. No. 12/490,492 Office Action dated Oct. 7, 2011.
U.S. Appl. No. 12/481,959 Final Office Action dated Oct. 27, 2010.
U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/321,358 Final Office Action dated Jan. 18, 2012.
U.S. Appl. No. 12/321,358 Office Action dated Aug. 29, 2011.
U.S. Appl. No. 12/287,716 Office Action dated Jun. 17, 2011.
U.S. Appl. No. 12/287,709 Office Action dated Mar. 29, 2011.
U.S. Appl. No. 12/231,293 Office Action dated Sep. 13, 2011.
U.S. Appl. No. 12/228,670 Office Action dated Jun. 20, 2011.
U.S. Appl. No. 12/227,462 Final Office Action dated May 26, 2011.
U.S. Appl. No. 12/227,462 Office Action dated Nov. 15, 2010.
U.S. Appl. No. 12/008,980 Office Action dated Aug. 31, 2011.
U.S. Appl. No. 12/008,980 Office Action dated Apr. 5, 2011.
U.S. Appl. No. 12/001,479 Final Office Action dated Oct. 31, 2011.
U.S. Appl. No. 12/001,479 Office Action dated Jun. 8, 2011.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Final Office Action dated Oct. 23, 2012.
U.S. Appl. No. 11/897,975 Office Action dated Jun. 8, 2012.
U.S. Appl. No. 11/897,975 Final Office Action dated Aug. 12, 2011.
U.S. Appl. No. 11/897,975 Office Action dated Mar. 1, 2011.
U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Nov. 16, 2011.
U.S. Appl. No. 11/637,615 Office Action dated Jul. 21, 2011.
U.S. Appl. No. 11/637,615 Final Office Action dated Aug. 2, 2010.
U.S. Appl. No. 11/637,615 Office Action dated Mar. 2, 2010.
International Search Report and Written Opinion from PCT/GB2008/050761 dated Sep. 17, 2009.
International Search Report and Written Opinion from PCT/GB2010/051050 dated Jan. 30, 2012.
International Search Report from PCT/GB2011/050975 dated Nov. 15, 2012.
EP Application No. 07 733 775.6 EPC Communication dated Dec. 9, 2010.
Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.
Adams et al., "The Advanced Technology Linear Separator Model ATL-1000," Drexel Oilfield Services, STC 03, 18 pages (1991).
AMS 2000 Description, Thule Rigtech, Rig Technology, 18 pages (2000).
Automated Chemical Additive System, Thule Rigtech, Rig Technology Ltd., 4 pages (2000).
Brandt Automated Shaker Control, Varco, 1 page (2002).
Brandt®, A Varco Company, King Cobra Series, Installation, Operation, and Maintenance Manual, M12444 R5, 65 pages (2003).
Brandt®, A Varco Company, LCM-2D LP Installation and Operation Manual, 84 pages (1998).
Brandt et al., Mud Equipment Manual—Handbook 3: Shale Shakers, Gulf Pub. Co., 18 pages (1982).
The Derrick LP Sandwich Shaker, Derrick Equipment Company, 4 pages (1981).
Fluid Systems Inc., The Prodigy Series I™ Dynamic Control Shaker, 2 pages (Apr. 27, 2004).
Sweco® Oilfield Services, LM-3 Full-Flo™ Shale Shaker, 4 pages (1991).
Axiom Ax-1 Shaker Brochure, 24 pages (2010).
Brandt, VSM-300™ Shaker Brochure, 4 pages (2001).
Brandt, VSM-Ultra Shaker Brochure, 2 pages (2003).
Extended European Search Report from Application No. 16154913.4 dated May 17, 2016.

\* cited by examiner

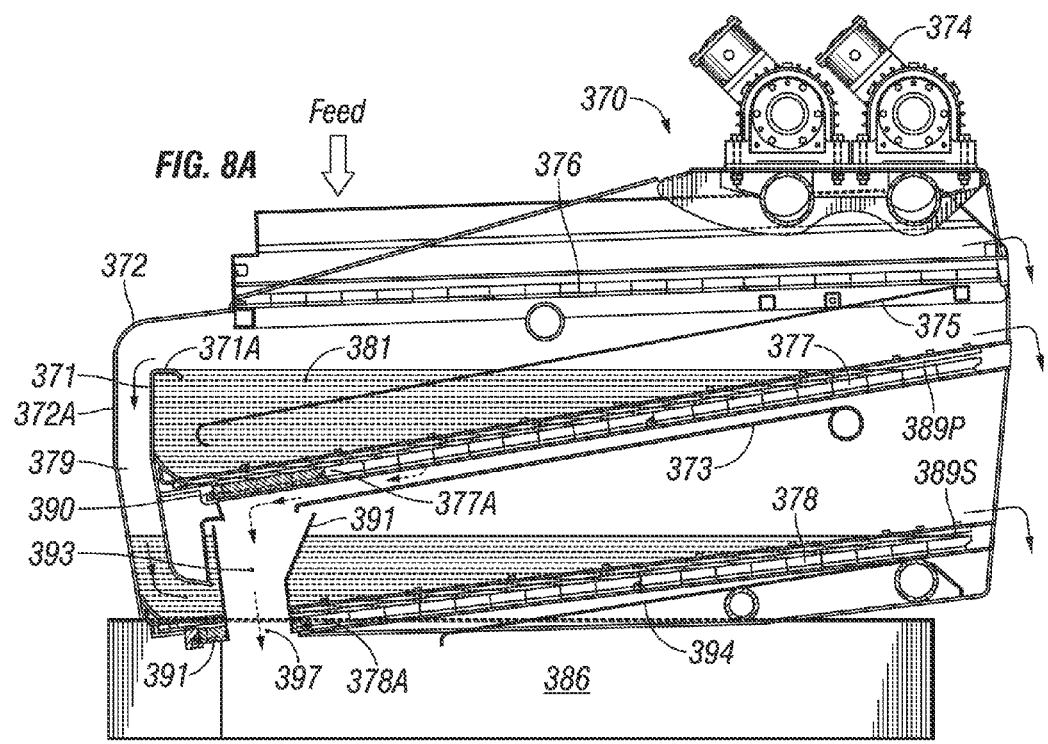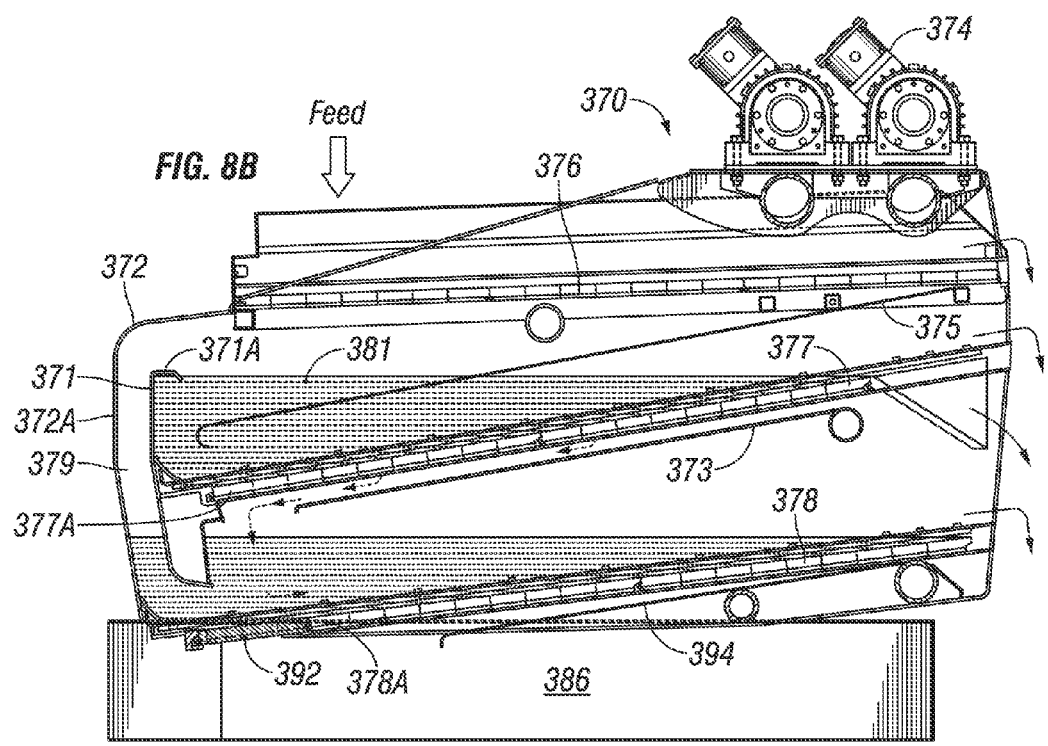

SHALE SHAKERS WITH SELECTIVE SERIES/PARALLEL FLOW PATH CONVERSION

CROSS-REFERENCE TO RELATED APPLICATIONS

This application is a divisional of U.S. application Ser. No. 12/490,492, filed Jun. 24, 2009, which was a continuation-in-part of U.S. application Ser. No. 12/287,709, filed on Oct. 10, 2008, now U.S. Pat. No. 8,113,356, incorporated by reference herein for all it discloses.

BACKGROUND OF THE INVENTION

1. Field of the Invention

The present invention is directed to drilling fluid processing systems; shale shakers; to methods for using these things; and, in certain particular aspects, to shale shakers with structure for converting shaker fluid flow paths from series to parallel, and vice versa.

2. Description of the Related Art

In the oil and gas industries, shale shakers use screens to treat drilling fluid contaminated with undesirable solids. Typically such apparatuses have a basket, deck, or other screen holding or mounting structure mounted in or over a receiving receptacle or tank and vibrating apparatus for vibrating one or more screens. Material to be treated is introduced to the screen(s) either by flowing it directly onto the screen(s) or by flowing it into a container, tank, or "possum belly" from which it then flows to the screen(s). Often, the screen or screens used to treat material is sealed in place on a screen deck, in a screen basket, or on screen mounting structure.

In the past it has been common to use multiple screens at multiple levels in a shale shaker to process drilling fluid, e.g., screens at one, two or three levels.

"Lost circulation" of drilling fluid occurs when, in drilling a wellbore, the circulation of drilling fluid to and then away from the drill bit ceases due to the porosity of the formation and/or due to fracturing of the formation through which the wellbore is being drilled. When lost circulation occurs, drilling fluid is pumped into the fractured formation rather than being returned to the surface. Often circulation is lost at some specific depth where the formation is "weak", and that the fracture extends horizontally away from the borehole. Expressions used to describe rocks that are susceptible to lost returns include terms like vugular limestone, unconsolidated sand, "rotten" shale, and the like.

A wide variety of "lost circulation materials" ("LCM") have been pumped into wellbores to fill or seal off a porous formation or to fill or seal off a wellbore fracture so that a proper route for drilling fluid circulation is re-established. Often lost circulation materials are generally divided into fibers, flakes, granules, and mixtures.

Often it is also desirable to recover and retain the lost circulation material in the drilling mud system during continuous circulation. Screening the drilling mud for removal of undesired particulate matter can also result in removal of the lost circulation material and, therefore, require continuous introduction of new lost circulation material to the drilling mud downstream of the mud screening operation.

The addition of lost circulation material compounds the separating problems because it, like the drilling fluid, is preferably cleaned and recirculated. Exiting the well is the drilling fluid of small size, the lost circulation material of a large size, and the undesirable material of a size therebetween, with the largest and smallest of the materials, and/or materials larger than the lost circulation material, to be re-circulated. One proposed solution to this separation problem is a conventional two step screening process as shown in U.S. Pat. No. 4,116,288. There the exiting mixture of drilling fluid, lost circulation material and undesirable material is first subjected to a coarse screening to separate the lost circulation material from the drilling fluid and undesirable material which drops to a second finer screen therebelow to separate the drilling fluid from the undesirable material. The drilling fluid and lost circulation material are then reunited for recirculation into the well. This system is susceptible to height restrictions and fine screen problems. The lost circulation material can be coated with undesirable material which will not go through a first screen, moves over and exits off of the top side of the first screen, and is circulated back into a well.

There are a variety of known drilling fluid processing systems, shale shakers, and methods for recovery of lost circulation material; including, for example, but not limited to, those in U.S. Pat. Nos. 6,868,972; 6,669,027; 6,662,952; 6,352,159; 6,510,947; 5,861,362; 5,392,925; 5,229,018; 4,696,353; 4,459,207; 4,495,065; 4,446,022; 4,306,974; 4,319,991; and 4,116,288 (all said patents incorporated by reference herein for all purposes).

In certain prior systems, problems have been encountered with systems for screening out lost circulation material when undesirable material of the same size is also screened out.

BRIEF SUMMARY OF THE INVENTION

The present invention discloses, in certain aspects, methods and systems for processing drilling fluid to recover components thereof and, in one particular aspect to multi-screen shale shakers in which fluid flow paths can be selectively changed from series to parallel, and vice versa.

In certain particular aspects, such methods and systems employs a novel shale shaker according to the present invention with screening apparatus including multiple screens and conversion apparatus for changing a first separation mode from material flowing from one screen to another in series to a second separation made in which fluid flows to multiple screens in parallel.

The present invention discloses, in certain aspects, a system for processing a mixture of drilling fluid and solid material to separate at least one component of the mixture by size from the mixture, the system including: a vibratable basket for receiving an input flow of drilling fluid with solids therein; a plurality of spaced-apart screen assemblies including a first screen assembly and a second screen assembly positioned below the first screen assembly; the screen assemblies mounted in the vibratable basket and vibratable therewith; conversion apparatus associated with the screen assemblies for selectively controlling the input flow to select one of series flow and parallel flow to the screen assemblies; drilling fluid flowable through the first screen assembly; and drilling fluid flowable through the second screen assembly and flowable down therefrom.

A vibratory separator or shale shaker, in one embodiment according to the present invention has a screen or screens at separate levels as described herein according to the present invention. In one particular aspect, two lowermost screens receive flow from a higher screen. Conversion apparatus permits this flow to be selectively changed from parallel to series, or vice-versa. The present invention, in certain embodiments, includes a vibratory separator or shale shaker with a base or frame; a "basket" or screen mounting apparatus on or in the base or frame; multiple screens at different, spaced-apart distinct levels according to the present invention; vibrating apparatus; mode conversion apparatus; and a collection tank or receptacle. Such a shale shaker can treat drilling fluid with solids therein, e.g. cuttings, debris, etc.; and drilling fluid with lost circulation material therein.

The present invention discloses, in certain aspects, a conversion apparatus for a system for processing a mixture of drilling fluid and solid material to separate at least one component of the mixture from the mixture, the system including a vibratable basket for receiving an input flow of drilling fluid with solids therein, a plurality of spaced-apart screen assemblies including a first screen assembly and a second screen assembly positioned below the first screen assembly, the screen assemblies mounted in the vibratable basket and vibratable therewith, drilling fluid flowable through the first screen assembly and the second screen assembly down therefrom, the conversion apparatus associated with the screen assemblies for selectively controlling the input flow to select one of series flow and parallel flow, the conversion apparatus including: a body, a first flow channel through the body for effecting system parallel flow to the screen assemblies, and a second flow channel through the body for effecting system series flow to the screen assemblies.

In certain particular aspects, an insert between screens is a movable gate structure between screens provides the mode conversion feature. In other aspects inserts adjacent screens, appropriate flow channeling, and appropriately located flowback barriers provide this mode conversion feature.

The present invention discloses, in certain aspects, a method for treating a flow of drilling fluid with solids, the method including introducing the flow of drilling fluid with solids to a system for separating at least one component from the flow, the system as any herein according to the present invention, the method further including selecting one of a system series flow to the screen assemblies or a system parallel flow to the screen assemblies using a conversion apparatus, flowing drilling fluid with solids to the screen assemblies, and screening the flow to each screening assembly.

The present invention discloses, in certain aspects, methods and systems for processing drilling fluid to recover components thereof and, in one particular aspect for separating lost circulation material (or lost circulation material along with solids of similar size) from used drilling fluid. In certain aspects, the separated lost circulation material is recovered and used.

In certain particular aspects, such methods and systems employs a novel shale shaker according to the present invention with screening apparatus below an initial scalper screen apparatus for separating lost circulation material (and/or material of similar size) from used drilling fluid.

A vibratory separator or shale shaker, in one embodiment according to the present invention has a screen or screens at separate levels as described herein according to the present invention. In one particular aspect, two lowermost screens can receive flow from a higher screen in parallel or in series. The present invention, in certain embodiments, includes a vibratory separator or shale shaker with a base or frame; a "basket" or screen mounting apparatus on or in the base or frame; screens at three or four different, spaced-apart distinct levels according to the present invention; vibrating apparatus; and a collection tank or receptacle. Such a shale shaker can treat drilling fluid contaminated with solids, e.g. cuttings, debris, etc.; and drilling fluid with lost circulation material (and/or material of similar size) therein. Such a shale shaker, in certain aspects, provides a separate exit stream from a second screening level which is primarily lost circulation material (and/or material of similar size).

Accordingly, the present invention includes features and advantages which are believed to enable it to advance the processing of drilling fluid with lost circulation material (and/or material of similar size) therein. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

In addition to the specific objects stated below for at least certain preferred embodiments of the invention, other objects and purposes will be readily apparent to one of skill in this art who has the benefit of this invention's teachings and disclosures.

It is, therefore, an object of at least certain preferred embodiments of the present invention to provide the embodiments and aspects listed above and:

New, useful, unique, efficient, non-obvious drilling fluid processing systems; shale shakers; and methods of the use of these systems and shakers;

Such shale shakers with screens at multiple levels and mode conversion apparatus so that material is screenable by multiple screens in series or in parallel selectively as desired;

Such shale shakers with screens at four levels according to the present invention with the last two screens operating in series or in parallel; and New, useful, unique, efficient, non-obvious drilling fluid processing systems and shale shakers; and methods of their use for separating and recovering lost circulation material (and/or material of similar size) from spent drilling fluid.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 5A" is a continuation of FIG. 5A'.

FIG. 8A is a side cross-sectional view of a shale shaker according to the present invention.

FIG. 8B is a side cross-sectional view of a shale shaker according to the present invention.

Figure 1:
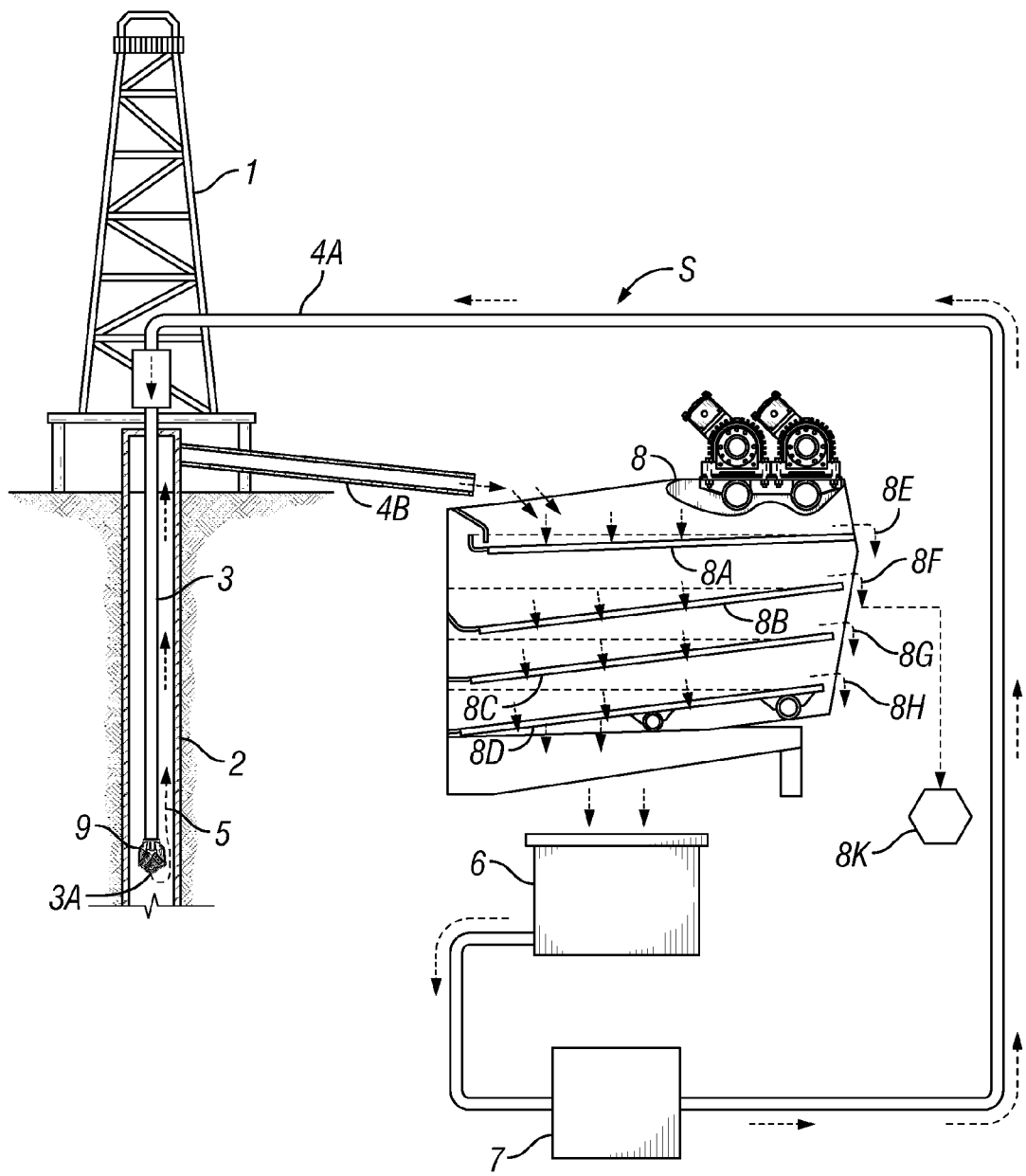
FIG. 1 is a schematic view of a system according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

FIG. 1 illustrates a system S according to the present invention which includes a derrick 1 that extends vertically over a wellbore 2. A tubular work string 3 extends into the wellbore 2, and extends from the earth's surface to a desired depth within the wellbore. A flow line 4a is connected to the tubular work string 3. A flow line 4b is connected to annular space 5 formed between the outer surface of tubular work string 3 and the inner surface of wellbore 2.

Drilling fluid (or "mud") for the system in a mud pit 6 is circulated through the overall mud system via a mud pump 7. During typical drilling operations, fluid is pumped into the tubular work string 3 by the mud pump 7 through the flow line 4a, circulated out a bottom end 3a of the tubular work string 3 (e.g., but not limited to, out from a drill bit 9), up an annulus 5 of the wellbore 2, and out of the annulus 5 via the flow line 4b.

Spent (or used) fluid mud exiting the wellbore annulus 5 through the flow line 4b includes drilling fluid, drill cuttings, lost circulation material (and/or material of similar size), and other debris encountered in the wellbore 2. Accordingly, the spent drill cuttings mixture leaving the well is directed to a separation device, such as one or more shale shakers 8 according to the present invention. The combined mixture of drilling fluid, added material (e.g. solids and/or lost circulation material, etc.), debris, and drilled cuttings are directed to the shale shakers 8. Liquid drilling fluid passes through screens at the same or at different levels of the shaker, e.g. screens 8a, 8b, 8c, 8d which are at four different levels of the shale shakers 8 and is directed into the mud pit 6 (or the two lowermost screens are at the same level each receiving a portion of flow from the screen 8b). Drill cuttings and other solids pass over the screens 8a-8d of the shale shakers 8 and are discharged (arrows 8e, 8f, 8g, 8h). With the proper selection of screen mesh for the screen 8b, lost circulation material (with some material of similar size, if present) is separated by and discharged from the top of the screen 8b (see arrow 8f). The recovered lost circulation material (and/or material of similar size) flows and/or is pumped to a mud pit, a reservoir, or to a further processing apparatus 8k. Optionally, the shale shakers 8 are like any other shale shaker disclosed herein according to the present invention. One, two, or more screens in series may separate selected material (e.g., but not limited to, lost circulation material) that flows and/or is pumped to a reservoir or to the further processing apparatus 8k.

Figure 1A:
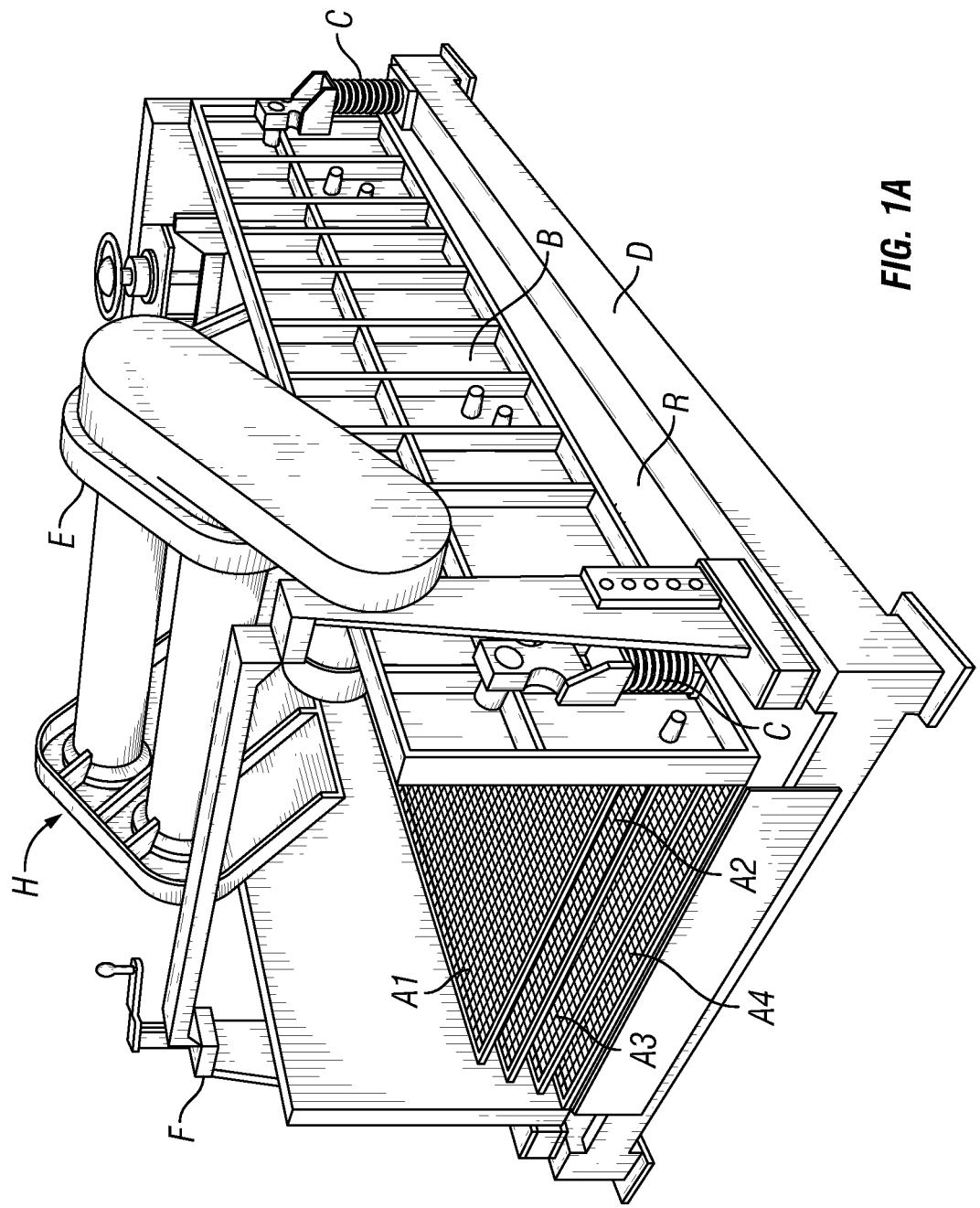
FIG. 1A is a perspective view of a shale shaker according to the present invention.

Referring now to FIG. 1A, a shale shaker H according to the present invention has screens A1, A2, A3, A4, each of which is, according to the present invention, at one of four different levels (with screen or screening cloth or mesh as desired). The screens are mounted on vibratable screen mounting apparatus or "basket" B. The screens A1, A2, A3, A4, according to the present invention, may be any suitable known screen or screens, with the screen A2 (or the screens A2 and A3) used to separate lost circulation material (and/or material of similar size). The basket B is mounted on springs C (only two shown; two as shown are on the opposite side) which are supported from a frame D. The basket B is vibrated by a motor and interconnected vibrating apparatus E which is mounted on the basket B for vibrating the basket and the screens. Elevator apparatus F provides for raising and lowering of the basket end. Fluid passing through the screens A1, A2, A3, and A4 flows into a receptacle R beneath the bottom screen A4. In certain aspects screen A1 has the coarsest mesh of all the screens and acts as a scalping screen and the screens A3 and A4 provide fine screening. The exit feeds from the top sides of the screens A1, A3, A4 may go to disposal or may be directed as described below for any embodiment of the present invention. The lost circulation material recovered from the top of the screen A2 (or, optionally, from the tops of the screens A2 and A3) may be flowed, processed and treated as described for any embodiment of the present invention. As shown, the screens A3, A4 operate in series, i.e., the underflow from the screen A3 flows down to the screen A4. Optionally, the screens A3, A4 may be operated in parallel with each receiving a portion of screen A2's underflow.

Figure 2A:
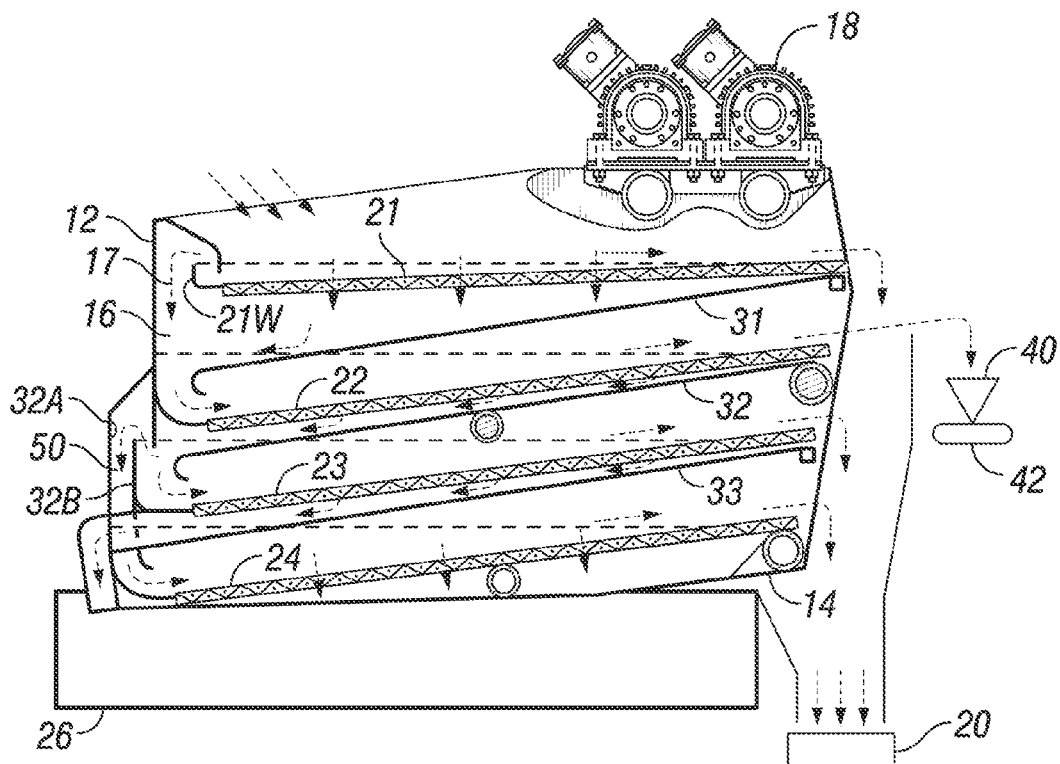
FIG. 2A is a side view, partially in cross-section, of a shale shaker according to the present invention.
Figure 2B:
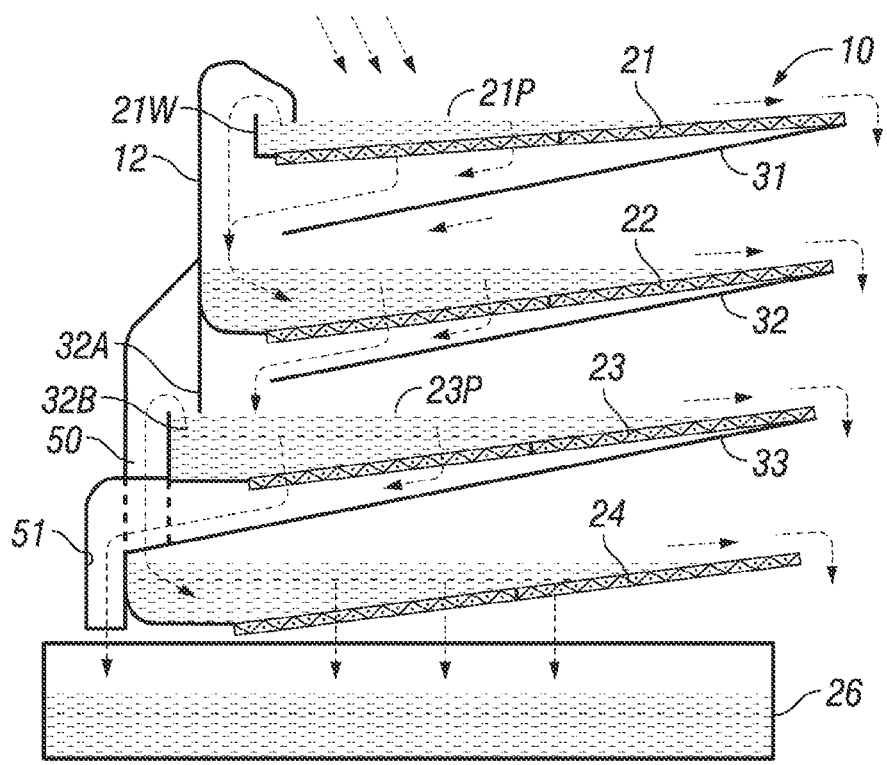
FIG. 2B is a cross-sectional view of the screens and related structure of the shale shaker of FIG. 2A.

FIGS. 2A and 2B show a system 10 according to the present invention which includes a shale shaker 12 with a base 14 and a screen-supporting basket 16. A vibrator apparatus 18 vibrates the basket 16 and screens mounted in it.

Four spaced-apart screens 21-24 are mounted in the basket 16 at different levels (e.g. spaced-apart six to eight inches) or put another way, at four different heights in the basket. In one particular embodiment the screen 21 is a scalping screen which, in one particular aspect removes relatively large pieces of material, e.g. with mesh sized so that pieces $1/8"$ and $1/64"$ are used. In one aspect, the screen 21 has a mesh size such that pieces greater than $1/16"$ are removed (and pieces of, among other things, solids and/or lost circulation material that are $1/16"$ or smaller in largest dimension pass through the screen 21 (e.g., but not limited to graphite ball lost circulation material that are 1/16" in largest dimension or slightly smaller).

The screen 22 has a mesh size as chosen for removing material of a certain largest dimension or larger, including, but not limited to solids, debris, drilled cuttings, desirable additives, and/or lost circulation material. In one aspect the mesh size is chosen in cooperation with the mesh size of the screen 21 so that the screen 22 removes lost circulation material (and solids or pieces of similar size) and, in one particular aspect the mesh size is chosen so that lost circulation material of a largest dimension of 1/16" or greater does not pass through the screen 22 and flows from the top thereof. In one aspect such lost circulation material is graphite balls.

The screens 23 and 24 further filter out solids from the flow through the screen 22 and, in certain aspects, the screens 23 and 24 act as typical standard fine screening screens used to process a mixture of drilling fluid and solids.

The exit streams from screens 21, 23, and 24 exit from the tops of their respective screens and flow down to a container, system or apparatus 20 for storage and/or further processing. Drilling fluid flowing through the screens flows down to a sump or container 26 and from there to a reservoir or, in one aspect, back to an active rig mud system. The exit stream from the screen 22, in particular aspects, has wet lost circulation material (or wet lost circulation material along with solids of similar size) of at least 50% by volume; and in one particular aspect at least 75% lost circulation material by volume (in one example, the output is 50% lost circulation material and 50% solids of similar size). In certain aspects, screen mesh size is chosen so that a relatively large percentage of the flow off the top of the screen is lost circulation material, e.g. by volume, up to 50%, 75%, or up to 90%.

Fluid with some solids therein (including the lost circulation material of a certain size, if present) that flows through the screen 21 is directed to the screen 22 by a flowback barrier (or plate) 31. Optionally, the flowback barrier 31 is eliminated. The material (including lost circulation material of a certain size, if present) that exits from the top of the screen 22 is transferred to a reclamation system 40 (which, in one aspect, is, has or includes an auger apparatus 42 for moving solids to and/or from the reclamation apparatus) or flushed to a mud pit.

Fluid with solids that flows through the screen 22 is directed to the screens 23 and 24 by a flowback barrier or plate 32, a flow channel 32a, and a weir 32b. Fluid with solids that flows through the screen 23 is directed to the sump 26 through a channel 51 by a flowback barrier 33 and a channel 33a. When the level of fluid (with material therein) exceeds the height of the weir 32b, part of the flow from the screen 22 flows into the flow channel 50 bypassing the screen 23 and flowing to the screen 24 (thus, the screens 23, 24 in this manner operate in parallel). Fluid flowing through the screen 24 flows into the sump 26. Optionally, the screen 21 includes an end weir 21w and fluid and material on top of the screen 21 in a pool 21p that exceeds the height of the weir 21w bypasses the screen 21 and flows to the screen 22 via a channel 17. The flowback barriers extend under substantially all of the surface of the particular screens under which they are located. Any one, two, or three of the flowback barriers can, optionally, be eliminated.

The screens 21-24 are at typical screen tilt angles, e.g. between 6 degrees to 12 degrees from the horizontal and in certain aspects, at about 7 degrees or about 8 degrees.

Figure 2C:
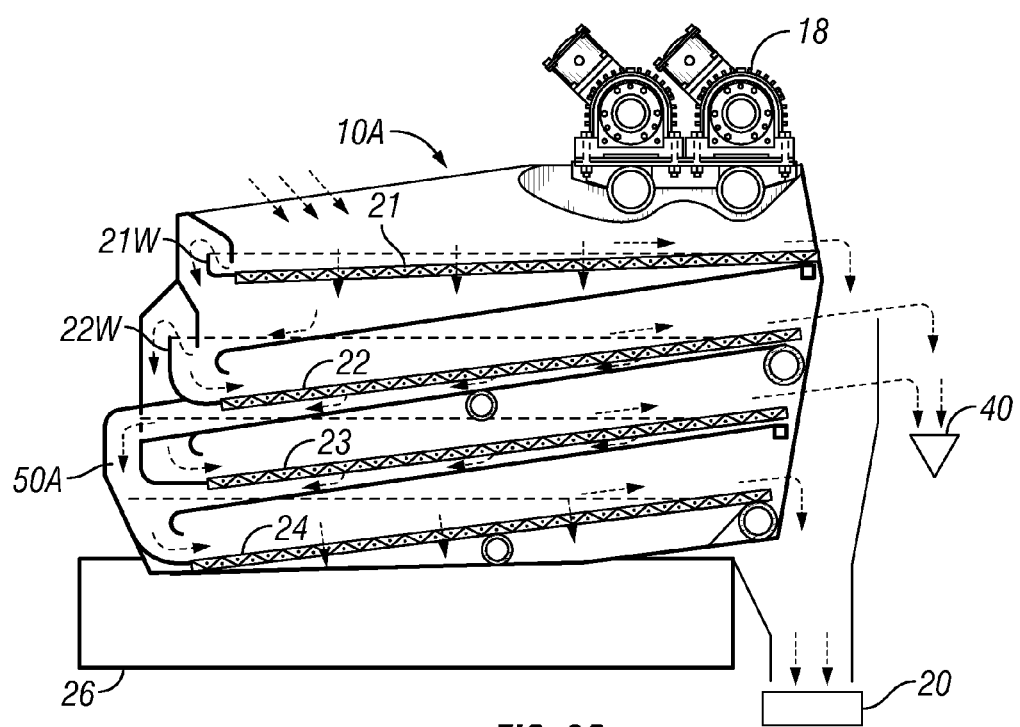
FIG. 2C is a cross-sectional view of a shale shaker according to the present invention.

A shale shaker 10a shown in FIG. 2C is like the system 10, FIG. 2A (and like numerals indicate like parts). Two screens, the screens 22 and 23, are used in the shale shaker 10a to remove LCM material (and/or material of similar size). The two screens 22, 23 act in parallel with flow from the upper screen 21 flowing both to the screen 22 and, over a weir 22w, to the screen 23. Fluid flowing through the screen 22 flows to a channel 50a and then down to the screen 24 as does fluid flowing through the screen 23.

Figure 3A:
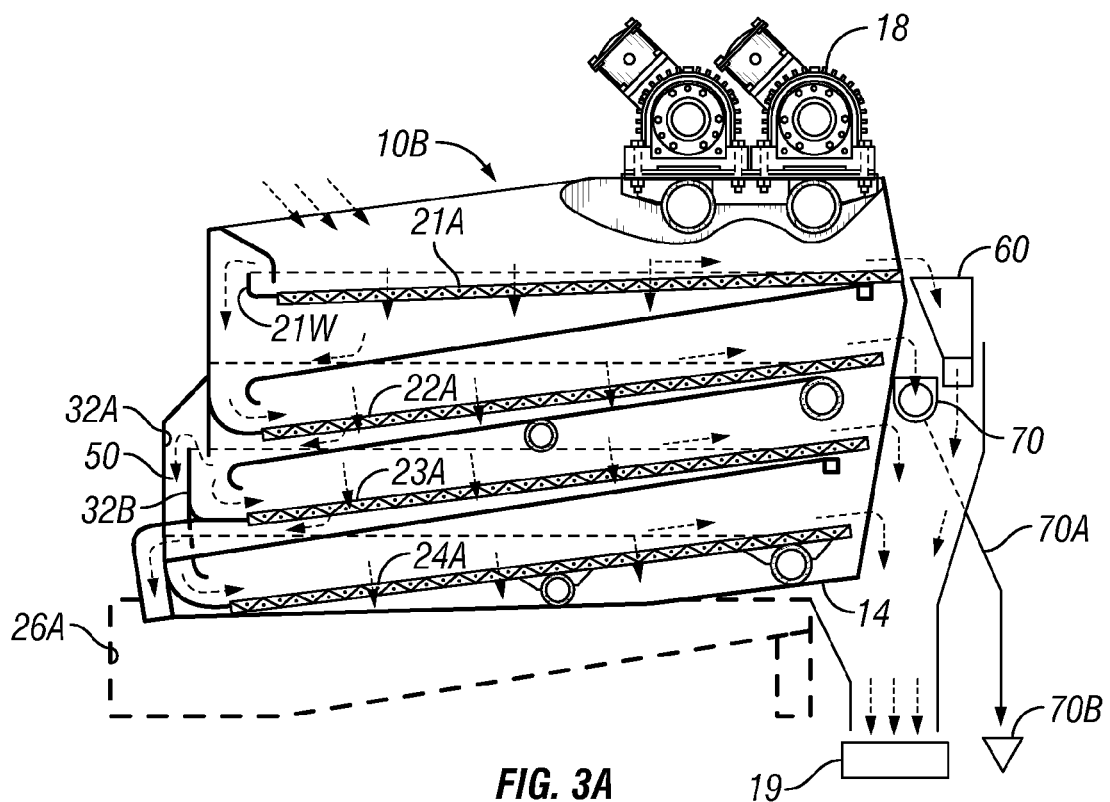
FIG. 3A is a side cutaway view of a shale shaker according to the present invention.
Figure 3B:
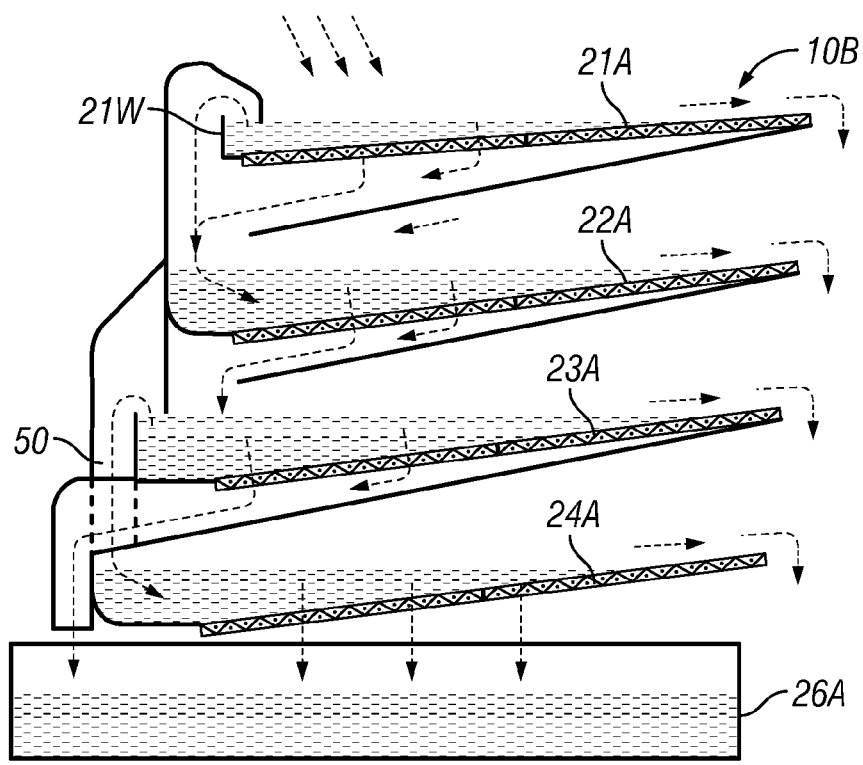
FIG. 3B is a side cutaway view of a shale shaker according to the present invention.

FIGS. 3A and 3B show a shaker system 10b like the system 10, FIG. 2A (like numerals indicate like parts). The shaker 10b has a collection chute 60 which receives material from top of a screen 21a (like the screen 21, FIG. 2A) and from which the material flows down to a cuttings ditch, pit, or collector 19. An auger system 70 receives material from the top of a screen 22a (like the screen 22) and augers the material into a conduit 70a from which it flows to storage or further processing apparatus 70b or is flushed to a mud pit. The flows from the tops of screens 23a (like screen 23) and 24a (like screen 24) flow to the cuttings ditch (etc.) 19. Fluid flowing through the screens flows to a sump 26a (like the sump 26). In one aspect, the screen 22a is used to recover LCM (and/or material of similar size). Optionally, as in FIG. 2C, both screens 22a and 23a are used to recover LCM (and/or material of similar size).

Material recovered from the top of a second screen in systems according to the present invention (e.g. from the top of the screen 8b, 21 or 21a) can, according to the present invention, be sent to additional treatment apparatus for further processing; including, but not limited to, a sprinkle-wash system for solids recovery, centrifuge(s), hydrocyclone(s), and/or magnetic separation apparatus. This material from the tops of these screens is, in one aspect, lost circulation material. In one aspect, considering the totality (100%) of the lost circulation material in a drilling fluid mixture fed to a top scalping screen of a system according to the present invention, about 97% of this lost circulation material flows to the second screen and about 95% (95% of the original totality of the material) is recovered from the top of the second screen; or optionally, a combination of similar sized material, including both LCM and other material is recovered.

Figure 4A:
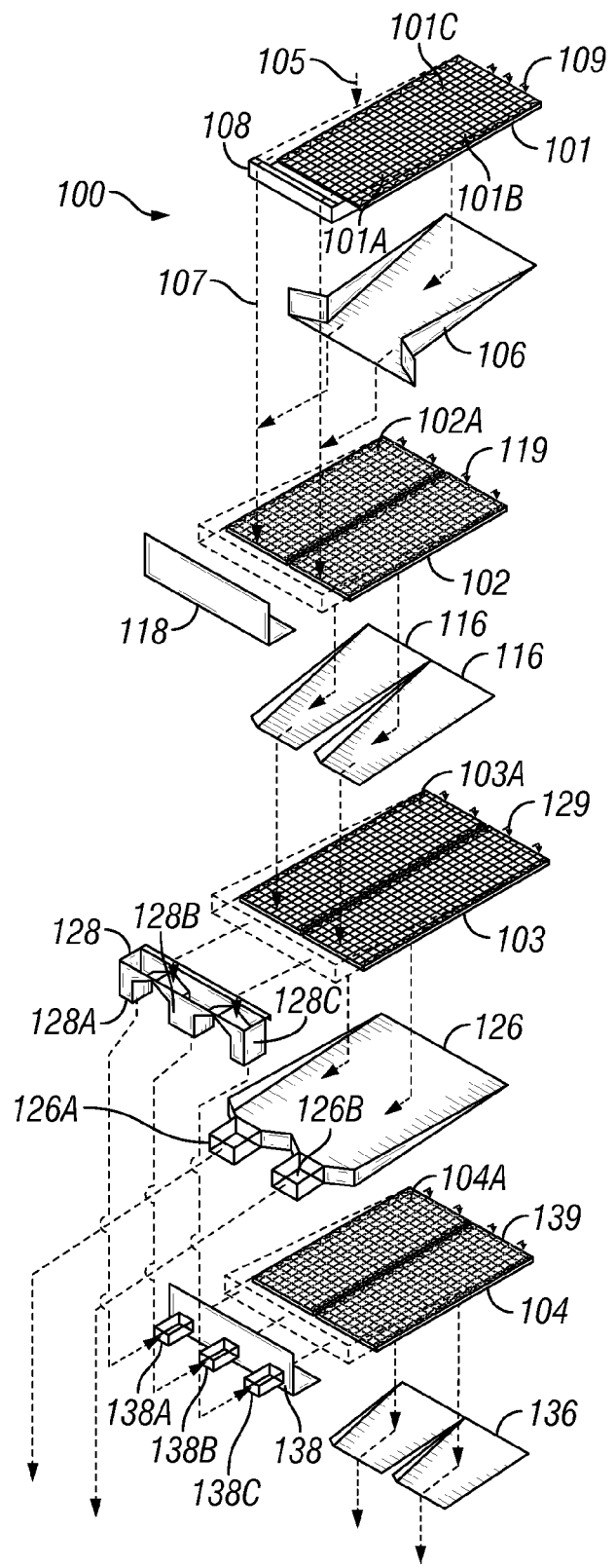
FIG. 4A is a perspective exploded view of a system according to the present invention.
Figure 4B:
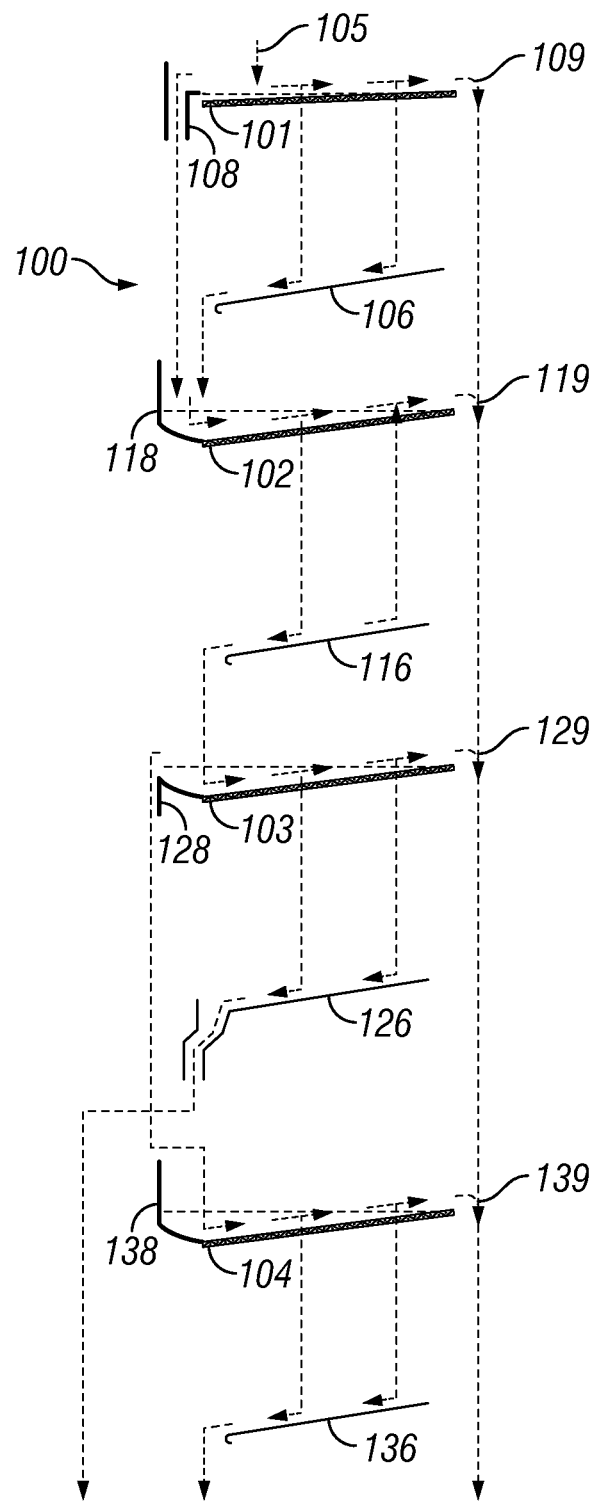
FIG. 4B is a schematic side view of the system of FIG. 4A.

FIGS. 4A and 4B illustrate a quad-tier system 100 according to the present invention which has screen decks 101, 102, 103, and 104. A feed 105 of a drilling fluid mixture is fed onto a first deck 101 with a plurality of screens 101a, 101b, 101c (may be any suitable number of screens). Drilling fluid (with some solids) flowing through the screens 101a-101c flows to a chute 106 and from there down to the deck 102. Overflow 107 from the deck 101 flows over a weir 108 (of a pre-determined height) down to the deck 102. Oversized material 109 flows off the top of the screen 101c.

Drilling fluid with some solids flowing through screens 102a (four shown; may be any suitable number of screens) flows to chutes 116 and from there to the deck 103. Oversize material 119 flows off the tops of screens 102a. A weir 118 prevents any overflow from the top of the screens 102a from flowing down to the deck 103.

Drilling fluid with some solids flowing through screens 103a (size shown; may be any number) of the deck 103 flows to a diverter 126 and from there to a collection structure, e.g. a tank, sump or receptacle. Overflow from the top of the screens 103a flows to a channel apparatus 128 and from there to a channel apparatus 138 which directs this flow to the top of the deck 104. Oversized material 129 flows off the tops of end screens 103a.

Drilling fluid flowing through screens 104a (four shown; any number may be used) flows down to chutes 136 and then to the tank, sump, or receptacle. Oversized material 139 flows off tops of end screens 104*a*.

The oversized material flows, 109, 119, 129 and 139 flow to typical collection sump, pit tank, or receptacle or storage apparatus and/or to subsequent processing apparatus.

In one particular aspect of the system 100, the deck 101 is a coarse screening deck (e.g. but not limited to the screen 8*a*, screen A1, screen 21 or screen 21*a*); the deck 102 is a medium mesh screening deck (e.g. but not limited to, like the screen 8*b*, screen A2, screen 22, or screen 22*a*); the deck 103 is a medium or fine screening deck (e.g., but not limited to, like the screen 8*c*, screen A3, screen 23 or screen 23*a*); and the deck 104 is a fine screening deck (e.g., but not limited to, like the screen 8*d*, screen A4, screen 24 or screen 24*a*).

Figure 5A:
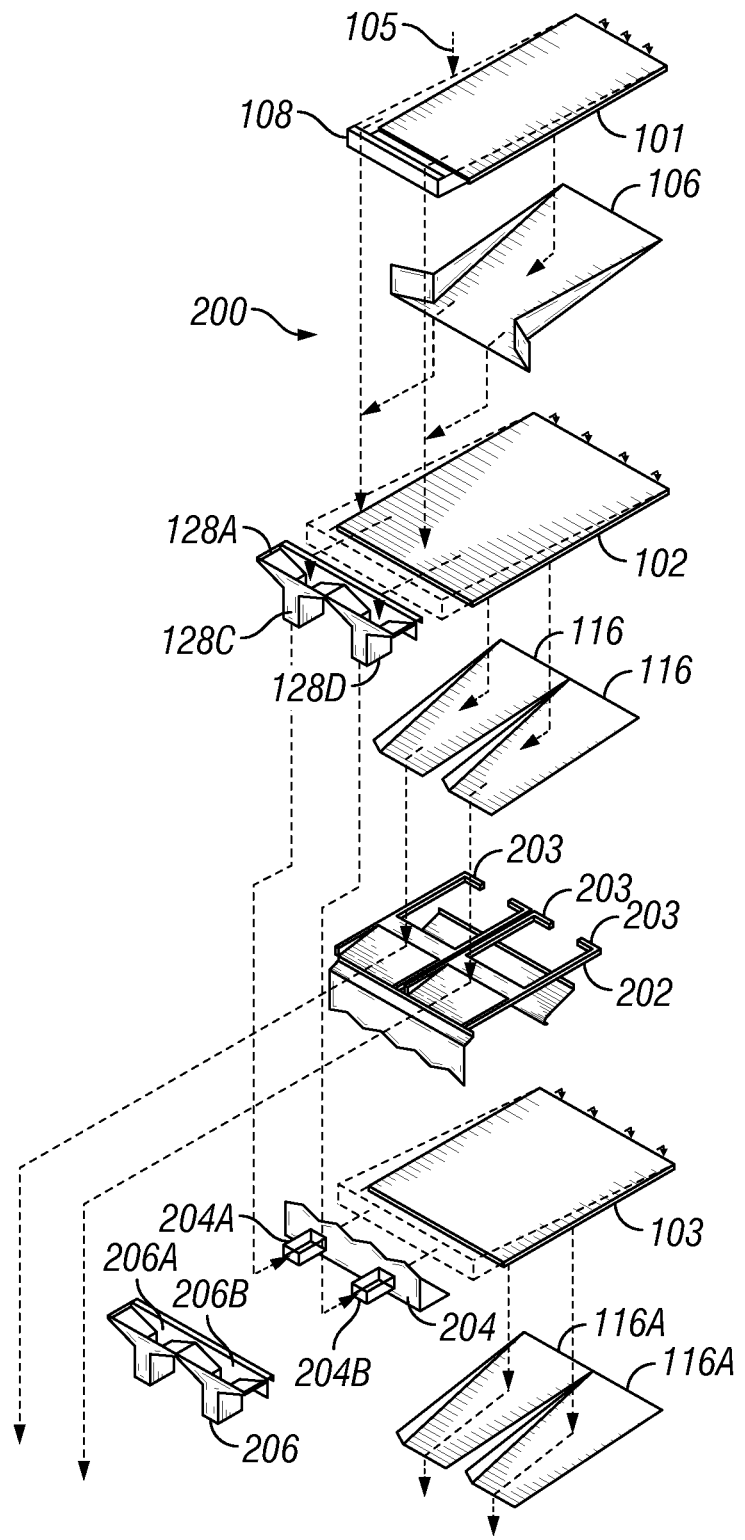
FIG. 5A' is a perspective exploded view of a system according to the present invention.
Figure 5A:
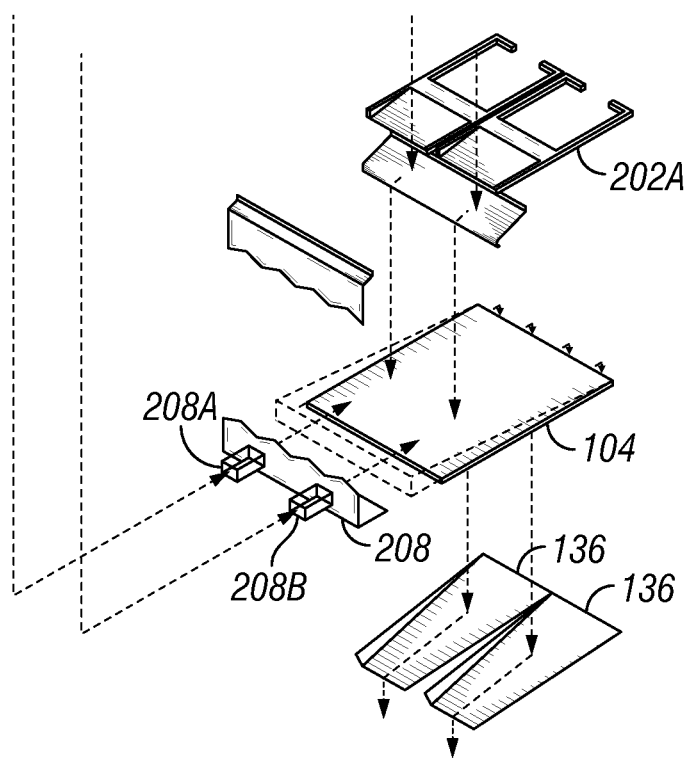
Figure 5B:
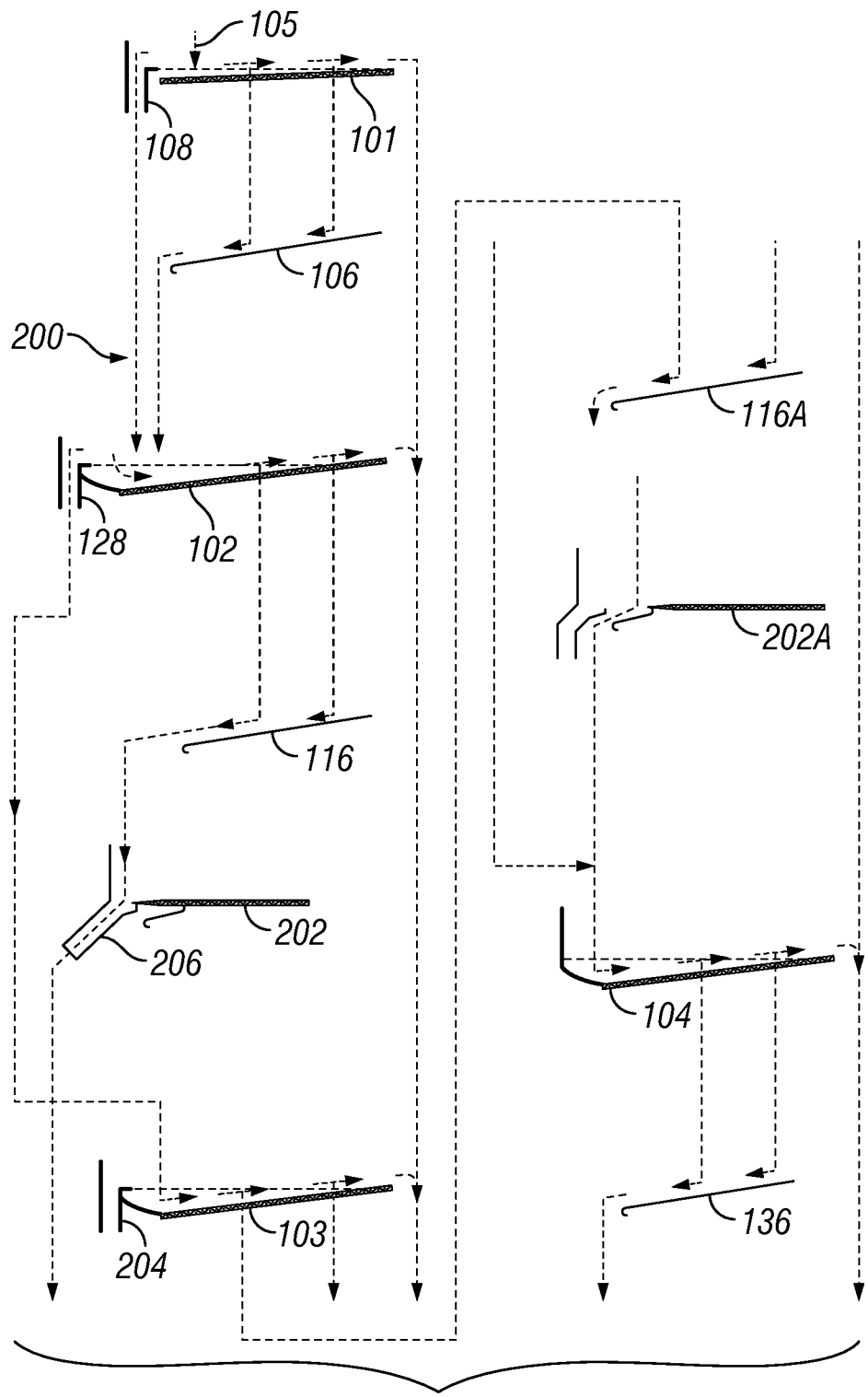
FIG. 5B is a schematic side view of the system of FIG. 5A.

FIGS. 5A', 5A", and 5B illustrate a system 200 according to the present invention which is, in some ways, like the system 100, FIG. 4A. In the system of FIG. 4A underflow from the deck 102 flows to both the deck 103 and the deck 104. In the system 200 flow from the deck 101 flows to both the deck 102 and the deck 103, with underflow from both of these decks flowing to the deck 104.

Drilling fluid with some solids (underflow from the deck 101) flows from the deck 101 down to the deck 102. Overflow from the deck 102 flows via the channel apparatus 128*a* and channel apparatus 204 to the deck 103. Underflow from the deck 102 flows to the chutes 116 and is diverted to the deck 104 by a diverter 202 (with handles 203) and via a channel apparatus 206 and a channel apparatus 208 to the deck 104. In one aspect the diverter 202 is connected to the channel apparatus 204 (indicated by the wavy lines on both).

Underflow having passed through the deck 103 and chutes 116*a* (like the chutes 116) is diverted by a diverter 202*a* (like the diverter 202) to the deck 104. Underflow having passed through the deck 104 flows to the chutes 136 and then to collection, storage, tank, or receptacle.

The various chutes, diverters, and channel apparatuses in the systems 100 and 200 are interchangeable, in one aspect, so that series or parallel flow to and from one or more selected decks is facilitated. In certain aspects, the chutes, diverters and channel apparatuses are made of metal, plastic, or composite material.

In the system 100, FIG. 4A, the channel apparatus 128 has three flow passages 128*a*, 128*b*, 128*c*. The diverter 126 has two flow passages 126*a*, 126*b*. The channel apparatus 138 has flow passages 138*a*, 138*b*, 138*c*. In the system 200, FIG. 5A, the channel apparatus 128*a* has flow channels 128*c*, 128*d*. The channel apparatus 204 has flow passage 204*a*, 204*b*. The channel apparatus 206 has flow passages 206*a*, 206*b*. The channel apparatus 208 has flow passages 208*a*, 208*b*.

The present invention, therefore, provides in at least certain embodiments, a system for processing a mixture of drilling fluid and solid material to separate at least one component of the mixture by size from the mixture, the system including a vibratable basket; a sump at a bottom of the basket; a plurality of spaced-apart screens including a first screen deck, a second screen deck positioned below the first screen, a third screen deck positioned below the second screen deck, and a fourth screen deck positioned below the third screen; the screens mounted in the vibratable basket and vibratable therewith; the first screen deck having screen mesh of a first size to remove from a top of the first screen deck solids from the mixture with a largest dimension equal to and larger than a first dimension so that material with a largest dimension smaller than the first dimension is passable down through the first screen deck; the second screen deck having screen mesh of a second size to remove from a top of the second screen solids from the mixture passing to the second screen deck from the first screen deck which have a largest dimension equal to or larger than the second size so that material with a largest dimension smaller than the second size is passable down through the second screen deck, material and fluid passing through the second screen deck comprising a secondary flow; diversion apparatus connected to the basket positioned for providing at least a portion of the secondary flow to the third screen deck and, selectively, a portion of the secondary flow to the fourth screen deck; the third screen deck having screen mesh of a third size, and the fourth screen deck having screen mesh of a fourth size for removing solids from the secondary flow on the top of the third screen deck and from the top of the fourth screen deck; and drilling fluid flowing through the first screen deck, the second screen deck and one of the third screen deck and fourth screen deck flowing down into the sump. Such a system may have one or some, in any possible combination, of the features and aspects described above for any system according to the present invention.

The present invention, therefore, provides in at least certain embodiments, a system for processing a mixture of drilling fluid and solid material to separate at least one component of the mixture by size from the mixture, the system including: a vibratable basket; a sump at a bottom of the basket; a plurality of spaced-apart screens including a first screen deck, a second screen deck positioned below the first screen, a third screen deck positioned below the second screen deck, and a fourth screen deck positioned below the third screen; the screens mounted in the vibratable basket and vibratable therewith; the first screen deck having screen mesh of a first size to remove from a top of the first screen solids from the mixture with a largest dimension equal to and larger than a first dimension so that material with a largest dimension smaller than the first dimension is passable down through the first screen deck; the second screen deck having screen mesh of a second size to remove from a top of the second screen solids from the mixture passing to the second screen deck from the first screen deck which have a largest dimension equal to or larger than the second size so that material with a largest dimension smaller than the second size is passable down through the second screen deck, material and fluid passing through the second screen deck comprising a secondary flow; diversion apparatus connected to the basket positioned for providing at least a portion of the secondary flow to the third screen deck and, selectively, a portion of the secondary flow to the fourth screen deck; the third screen deck having screen mesh of a third size, and the fourth screen deck having screen mesh of a fourth size for removing solids from the secondary flow on the top of the third screen deck and from the top of the fourth screen deck; drilling fluid flowing through the first screen deck, the second screen deck and one of the third screen deck and fourth screen deck flowing down into the sump; wherein the first screen deck is a scalping deck; wherein the screen mesh of a second size is suitable for removing solids the size of lost circulation material, said solids including pieces of lost circulation material and pieces of material other than lost circulation material; the drilling fluid mixture introduced to the system to be treated by the system includes a first amount of lost circulation material; the second deck is able to remove a second amount of lost circulation material; the second amount at least 75% of the first amount; and reclamation apparatus for receiving the lost circulation material.

The present invention, therefore, provides in at least certain embodiments, a method for treating a mixture of drilling fluid and solid material to separate at least one component of the mixture by size from the mixture, the method including: feeding the mixture to a vibratable basket of a system, the system as any described herein according to the present invention, and the method further including flowing drilling fluid through a first screen deck, a second screen deck and one of a third screen deck and a fourth screen deck of the system down into a sump; or flowing drilling fluid through a first screen deck, and one of a second screen deck and a third screen deck flowing down into a sump.

FIGS. 6A-6D show a shale shaker 310 according to the present invention which has a basket 312 vibrated by vibratory apparatus 314 and a lower sump 316 which receives fluid (or fluid and some solids) that passes through three screens 318a, 318b, 318c which are mounted to the basket 312 at different levels.

Fluid from the screen 318a flows down to a flowback barrier 317a, through an opening 328, and then onto the screen 318b. As this fluid builds up into a pool 315a on the screen 318b, it rises to a level equal to and then greater than a top 313a of a weir 313. Fluid then flows over the top 313a of the weir 313 through a channel 311 to the lower screen 318c. The opening 328 is defined by the weir 313 and an end of the flowback barrier 317a.

Fluid that flows through the screen 318b flows down a flowback barrier 317b, over an end of a diverter 320, and down to the sump 316 via a channel 316a.

Figure 6A:
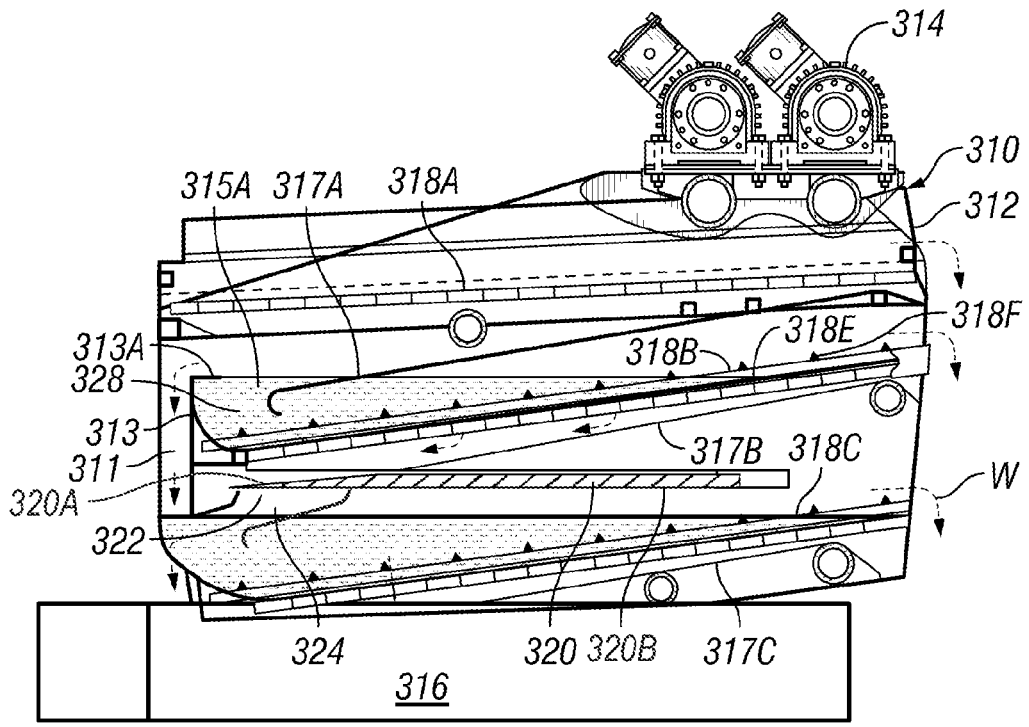
FIG. 6A is a side cross-sectional view of a shale shaker according to the present invention.
Figure 6B:
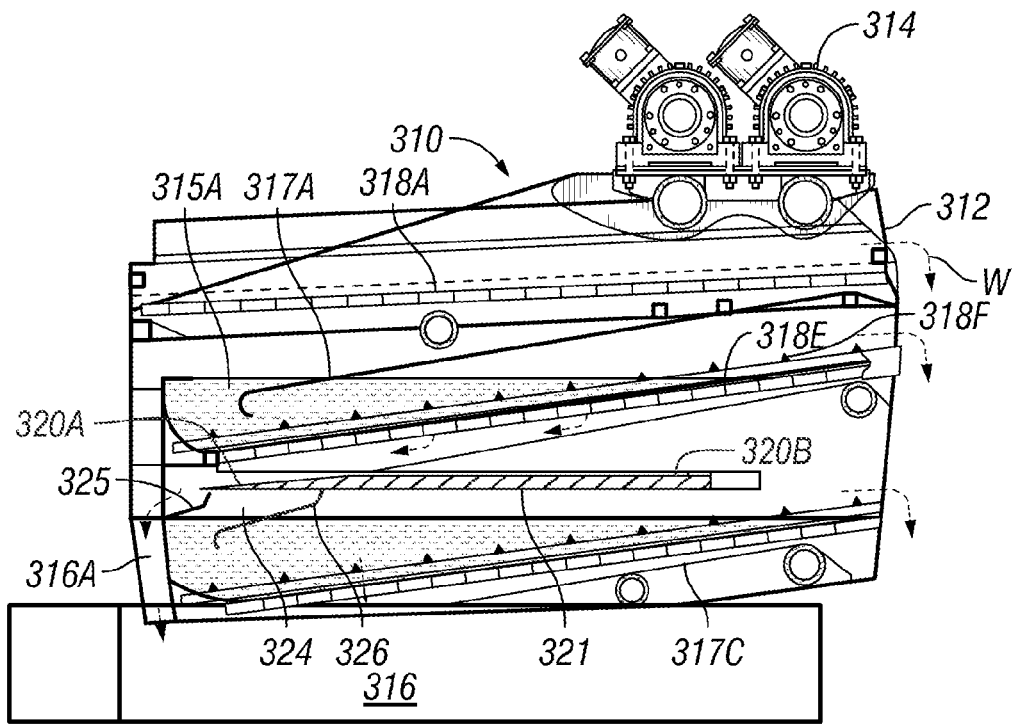
FIG. 6B is a side cross-sectional view of the shale shaker of FIG. 6A.

The diverter 320 is selectively movable in holding structure 320a and, as in FIG. 6A, blocks an opening 322 of a channel 324 formed by spaced-apart members 325, 326. As shown in FIG. 6B, the diverter 320 prevents fluid that has exited from the bottom of the screen 318b from flowing onto the screen 318c. This fluid flows past the opening 322 into the channel 316a. FIGS. 6A and 6B illustrate a parallel fluid flow path.

Figure 6C:
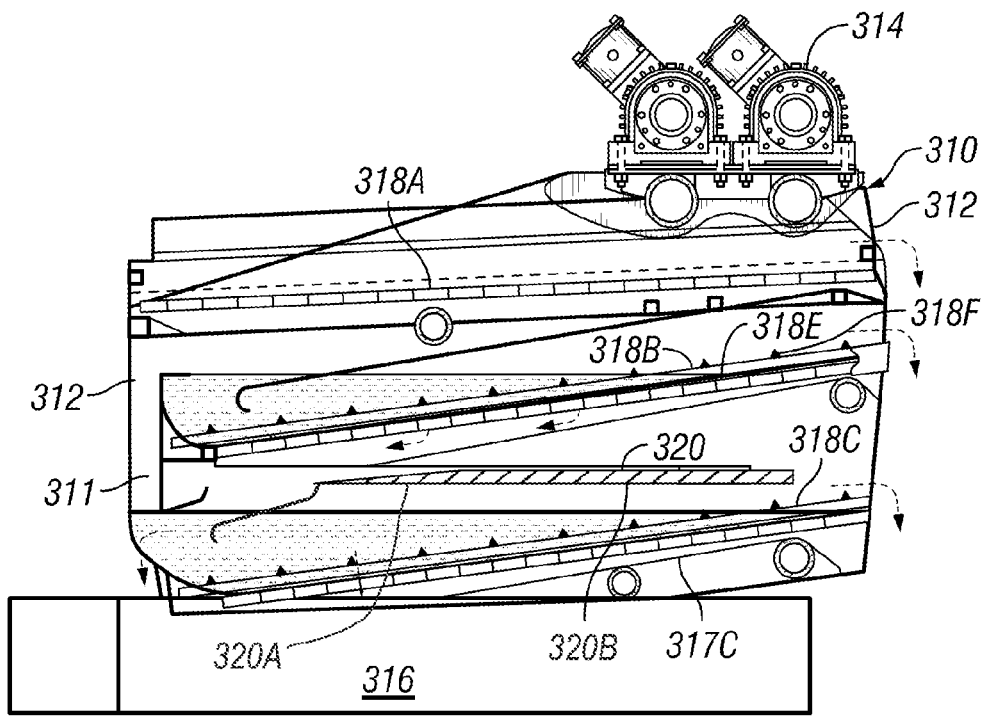
FIG. 6C is a side cross-sectional view of a shale shaker according to the present invention.
Figure 6D:
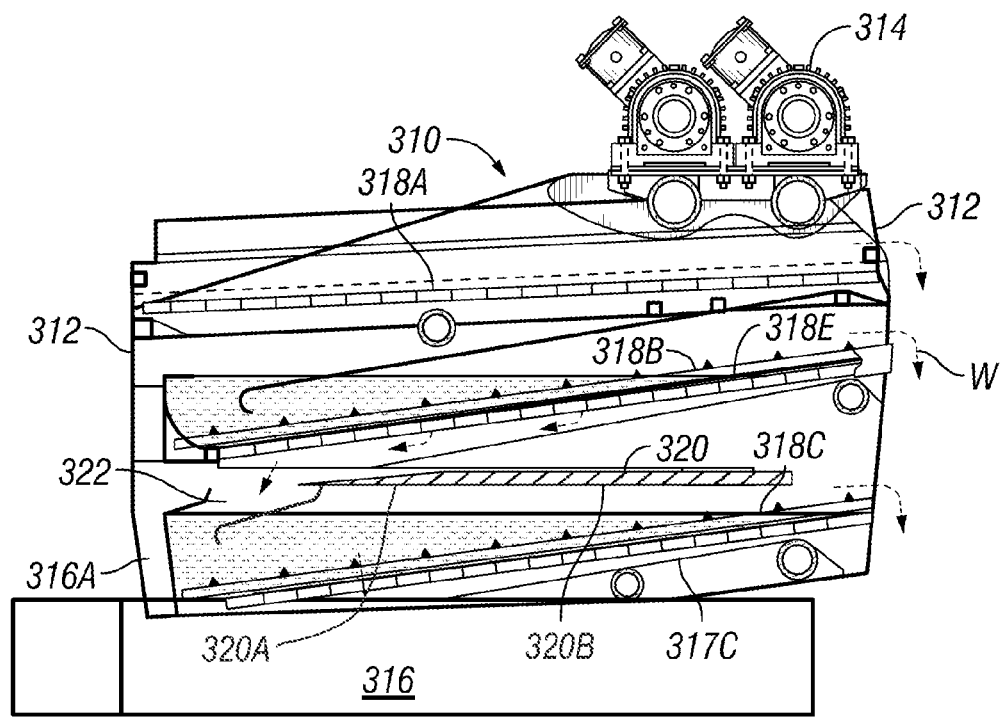
FIG. 6D is a side cross-sectional view of the shale shaker of FIG. 6C.

As shown in FIGS. 6C and 6D, the diverter 320 has been moved so that fluid is flowable down onto the screen 318c which has exited through the bottom of the screen 318b. This is an "in series" flow path—from the screen 318a to the screen 318b to the screen 318c—for fluid down to the sump 316.

Figure 6E:
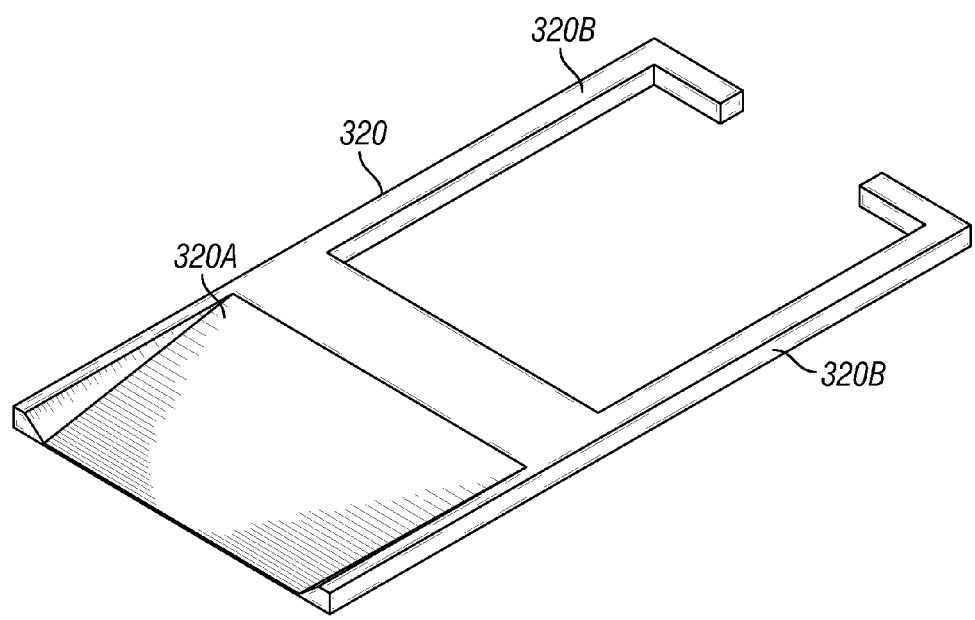
FIG. 6E is a perspective view of a diverter according to the present invention.
Figure 6G:
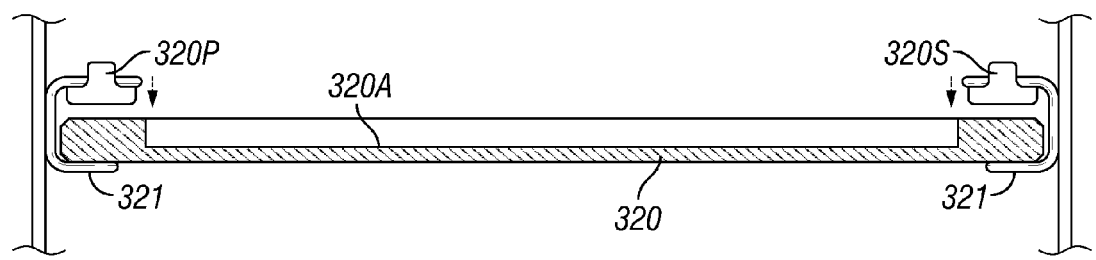
FIG. 6G is a cross-section view of the diverter of FIG. 6E in the shaker of FIG. 6A.
Figure 6F:
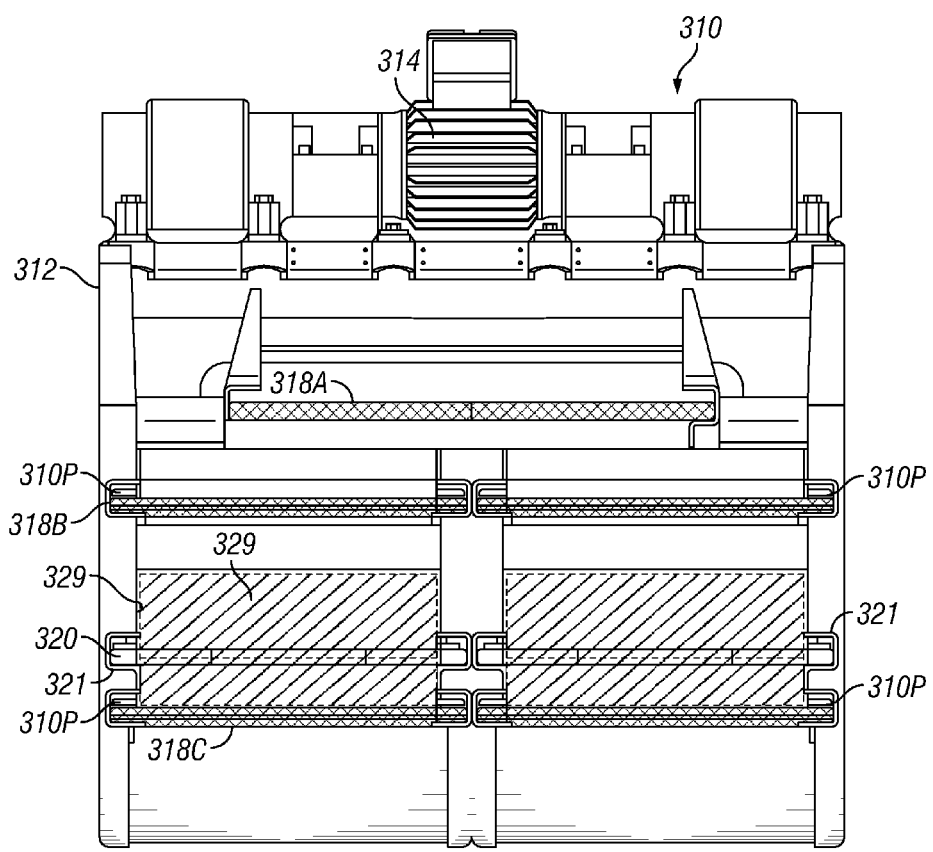
FIG. 6F is a front view of the shaker of FIG. 6A.

The diverter 320 can be manipulated and moved through an open end access area 329 (FIG. 6F) of the basket 312. As shown in FIG. 6E, the diverter 320 has a solid chute portion 320a for facilitating fluid flow and two handles 320b projecting from the chute portion 320a.

The angle from the horizontal of the screen 318b coupled with the height of the weir 313 determines the depth of the pool 315a and of a lower edge 318e of a beach area 318f on the screen 318b (e.g., see FIG. 6C).

Fluid flowing through the screen 318c flows down a flowback barrier 317c into the sump 316. Solids (wet to some degree) flow off the ends of the screens as indicated by the arrows W.

The diverter 320 is mounted between rails 321 of the holding structure 320a (see, e.g., FIG. 6G) and clamping apparatuses 320p, 320s are used to hold the diverter 320 in place. Any suitable clamping apparatus may be used including, without limitation, pneumoseal apparatuses. Clamping apparatuses 310p hold the screens in place.

Figure 7A:
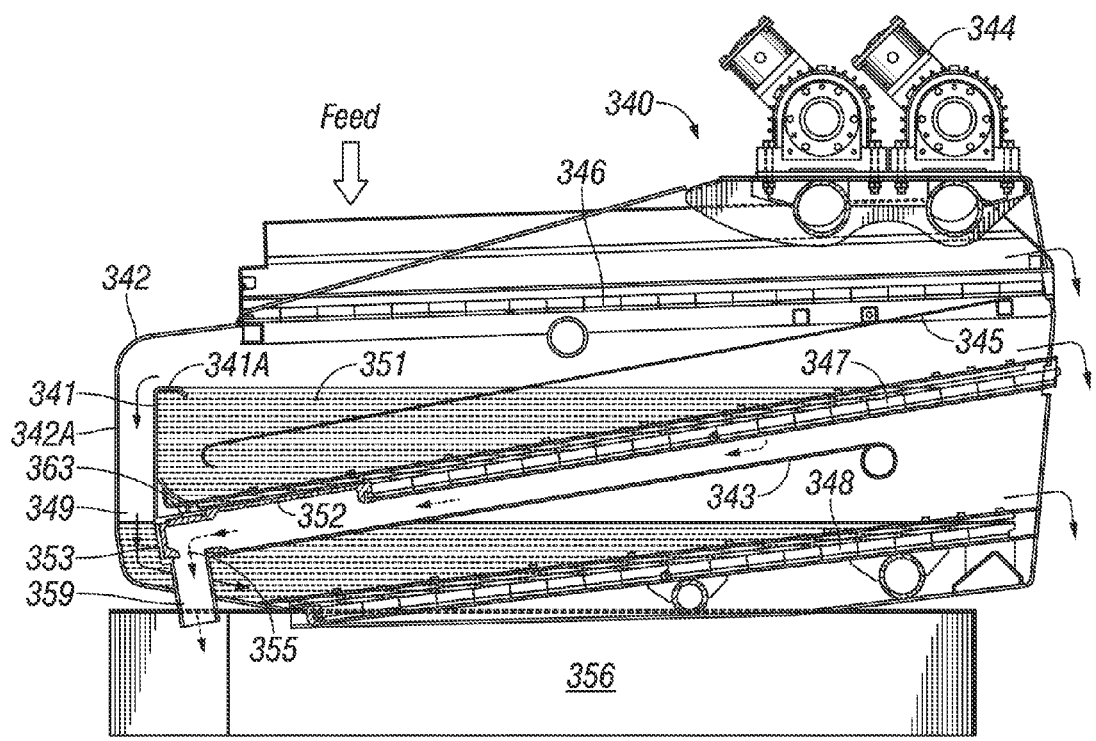
FIG. 7A is a side cross-sectional view of a shale shaker according to the present invention.
Figure 7B:
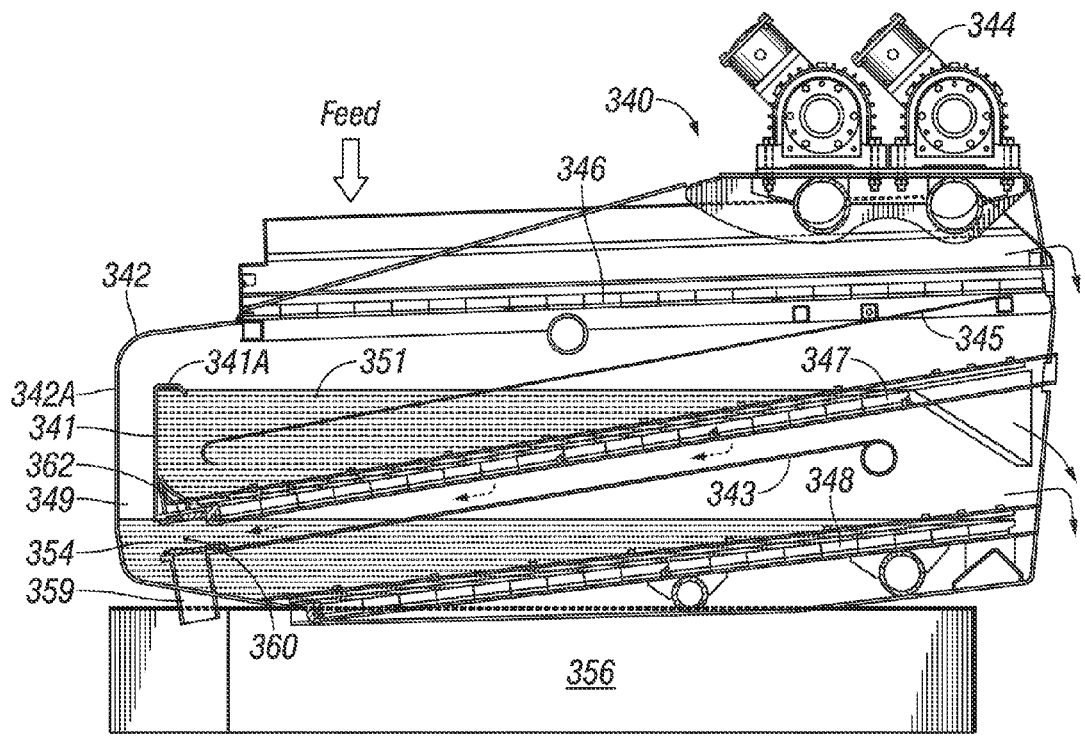
FIG. 7B is a side cross-sectional view of a shale shaker according to the present invention.

FIGS. 7A and 7B show a shale shaker 340 according to the present invention with a basket 342 vibrated by vibratory apparatus 344. Screens 346, 347, 348 are mounted in the basket with a flowback barrier 345 beneath the screen 346 and flowback barrier 343 beneath the screen 347.

A weir 341 with a top end 341a defines (with an end 342a of the basket 342) a flow channel 349 for fluid flowing over the top 341a of the weir 341 from a pool 351 of fluid on the screen 347. Fluid flowing down in the channel 349 flows to the lowermost screen 348. Fluid flowing through the screen 348 flows into a sump 356.

The screen 347 has flow barrier 352 (see FIG. 7C) connected therebelow with an end 353 which, in the position shown in FIG. 7A, blocks an opening 354 (see, FIG. 7B) so that fluid flowing in the channel 349 cannot flow into a channel 359. Also, with the opening 354 blocked, fluid flowing down through the screen 347 flows along the flowback barrier 343 to the opening 354, into the channel 359, and then into the sump 356. Thus the flow mode for the screens 347 and 348 as shown in FIG. 7A is parallel-fluid flowing through the screen 347 does not flow to the screen 348.

As shown in FIG. 7B, the screen 347 does not have the flow barrier 352 below it and the channel 359 is closed to fluid flow by a flow barrier 362. With the channel 359 closed by the flow barrier 362 and with the end 353 removed from the opening 354, fluid flowing through the screen 347 flows onto the screen 348 and thus the flow mode, as shown in FIG. 7B, is in series for the screens 347, 348.

Figure 7C:
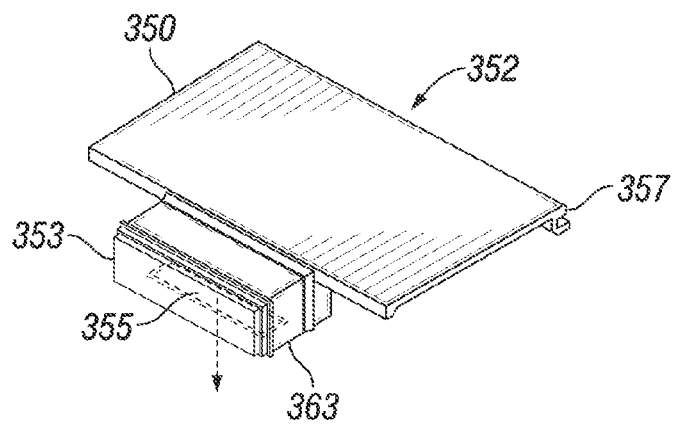
FIG. 7C is a perspective view of a flow barrier according to the present invention.
Figure 7D:
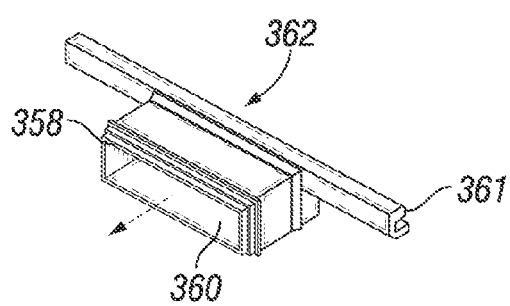
FIG. 7D is a perspective view of a flow barrier according to the present invention.

As shown in FIG. 7C, for parallel flow, the flow barrier 352 has a body 363 with a flow channel 355 therethrough; a solid portion 350; and an end connection 357 for connection to the screen 347. As shown in FIG. 7D the flow barrier 362 has a body 358 with a flow channel 360 therethrough and a connection 361 for connection to the screen 347. FIG. 7D illustrates the flow path for series flow.

Figure 8C:
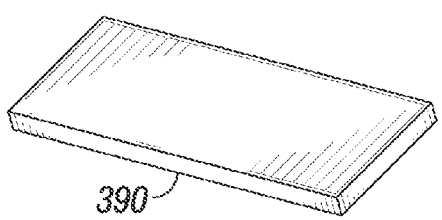
FIG. 8C is a perspective view of an insert according to the present invention.

FIGS. 8A and 8B show a shale shaker 370 according to the present invention with a basket 372 vibrated by vibratory apparatus 374. Screens 376, 377, 378 are mounted in the basket with a flowback barrier 375 beneath the screen 376 and flowback barrier 373 beneath the screen 377.

A weir 371 with a top end 371a defines (with an end 372a of the basket 372) a flow channel 379 for fluid flowing over the top 371a of the weir 371 from a pool 381 of fluid on the screen 377. Fluid flowing down (FIG. 8A) in the channel 379 flows to the lowermost screen 378. Fluid flowing through the screen 378 flows along a flowback barrier 394 into a sump 386.

Figure 8D:
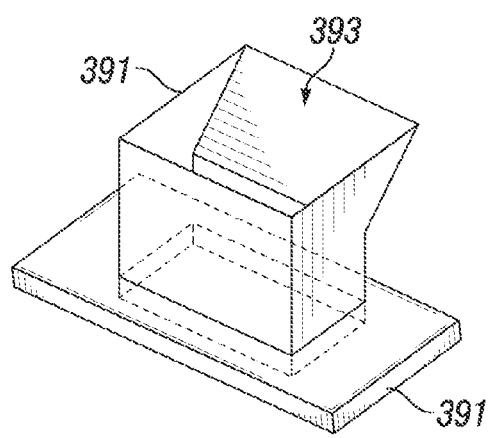
FIG. 8D is a perspective view of a channel apparatus according to the present invention.

The screen 377 has an insert 390 at an end 377a which is in the position shown in FIG. 8A. Fluid flowing through the screen 377 flows into a flow channel 393 of a channel apparatus 391 (see FIG. 8D) positioned in an opening 397 at an end 378a of the screen 378 and then into the sump 386. Pneumoseal apparatus 389p, 389s facilitates the clamping in place of the screens and inserts, and the maintenance of the screens and inserts in a desired position.

Fluid from the pool 381 flowing over the top 371a of the weir 371 flows in the channel 379 down to the screen 378. Fluid flowing through the screen 378 flows into the sump 386. Thus the flow from the screen 376 to and through the screens 377, 378 is in a parallel flow mode.

Figure 8E:
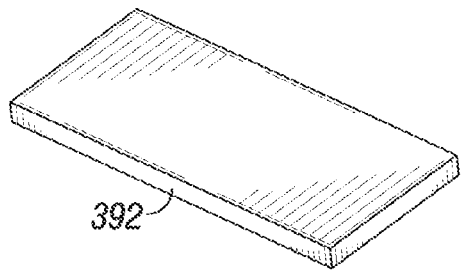
FIG. 8E is a perspective view of an insert according to the present invention.

As shown in FIG. 8B, the insert 390 and the channel apparatus 391 have been removed, and the screen 377 has been moved down so that the end 377a now occupies the position of the insert 390. Fluid flowing through the screen 376 flows down to the screen 377. Then fluid flowing through the screen 377 flows down to the screen 378 through an opening 374. An insert 392, FIG. 8E, replaces the channel apparatus 391 at the lower end 378a of the screen 378 and blocks flow through the opening 397 (see FIG. 8a).

FIGS. 9A-9D show a shaker 400 with a sump 416 and basket 402 vibrated by vibratory apparatus 404. Screens 411, 412, and 413 are mounted in the basket 402. A flowback barrier 401 is below the screen 411, a flowback barrier 414 is below the screen 412, and a flowback barrier 415 is below the screen 413.

A weir 405 having a top end 405a with an end portion 402a of the basket 402 defines a channel 409 through which flows fluid coming over the top end 405a of the weir 405 from a pool 406 of fluid on the screen 412. Fluid flows down and out of the channel 409 to contact and flow through an insert 417 positioned at an end 412a of the screen 412. Fluid flows through a passageway 418 in the insert 417 (see FIGS. 9E-9F) to a channel 419 and down to the screen 413. Thus fluid flows from the screen 411 to both the screens 412 and 413 in a parallel flow mode.

Fluid flowing through the screen 412 flows to and through channels 417a, 417b in the insert 417, from there into a channel 410, and down to the sump 416.

Figure 9A:
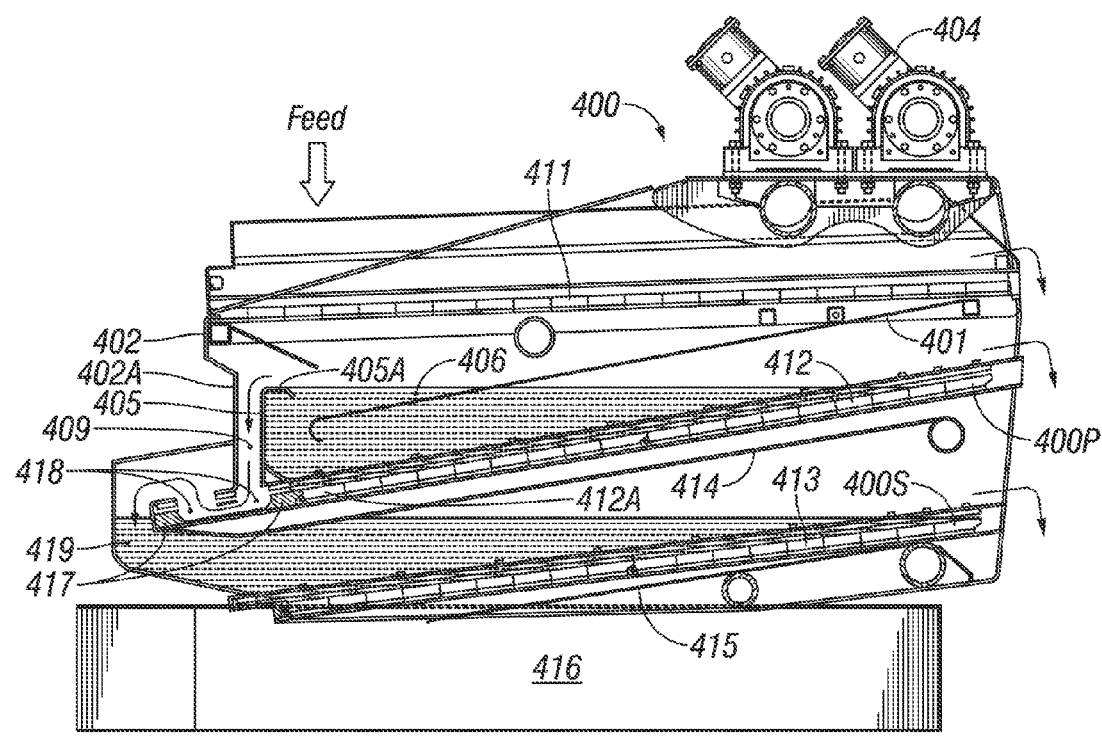
FIG. 9A is a side cross-sectional view of a shale shaker according to the present invention.
Figure 9B:
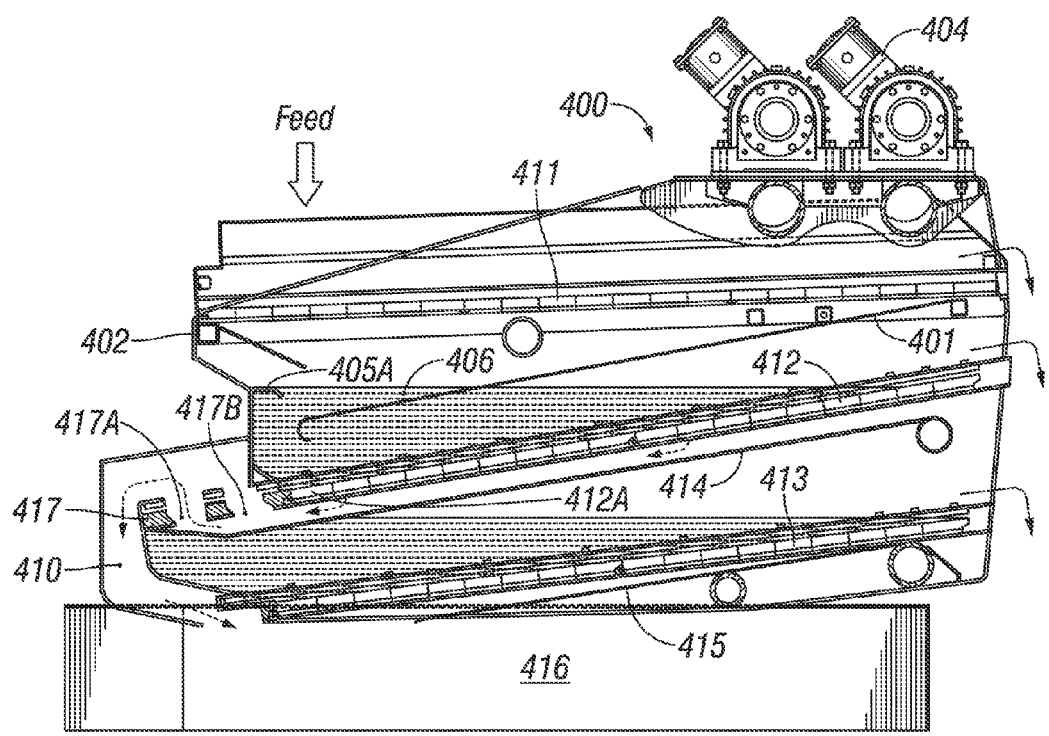
FIG. 9B is a side cross-sectional view of the shale shaker of FIG. 9A.
Figure 9C:
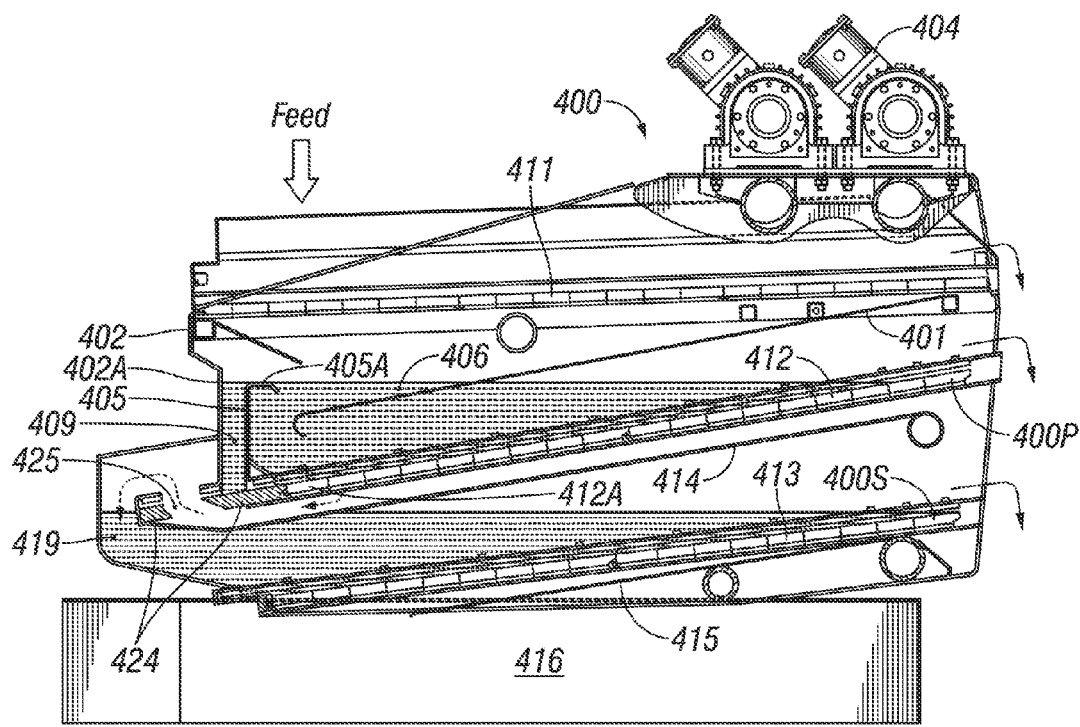
FIG. 9C is a side cross-sectional view of a shale shaker according to the present invention.
Figure 9D:
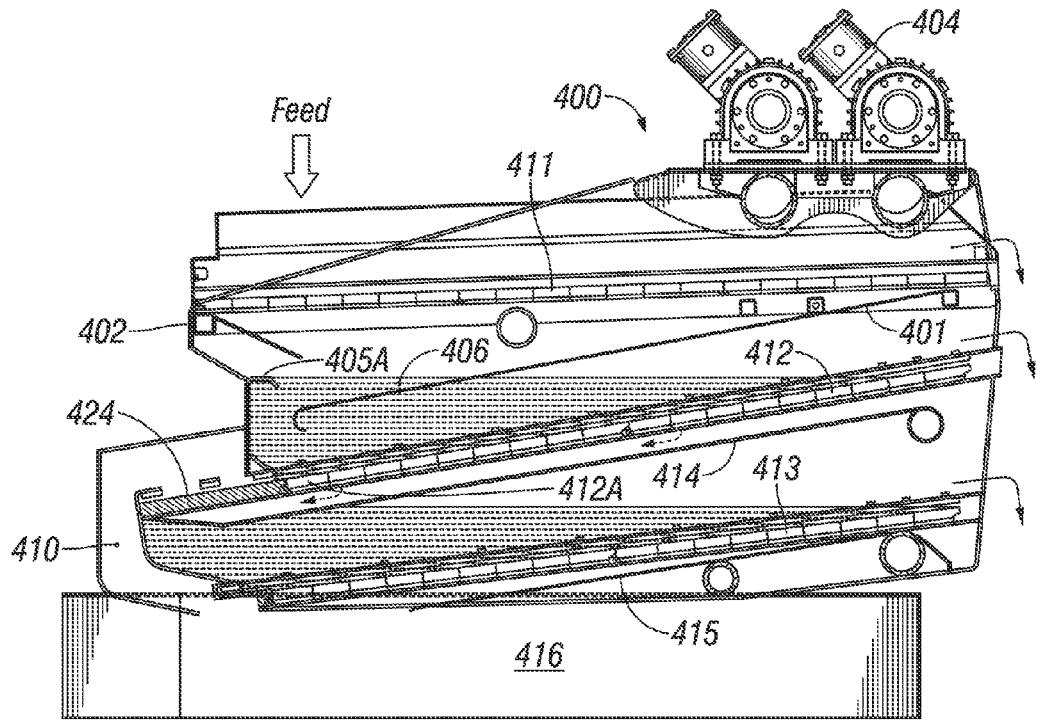
FIG. 9D is a side cross-sectional view of the shale shaker of FIG. 9C.
Figure 9E:
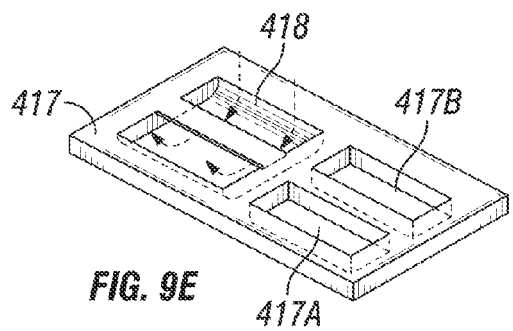
FIG. 9E is a perspective view of an insert according to the present invention.
Figure 9F:
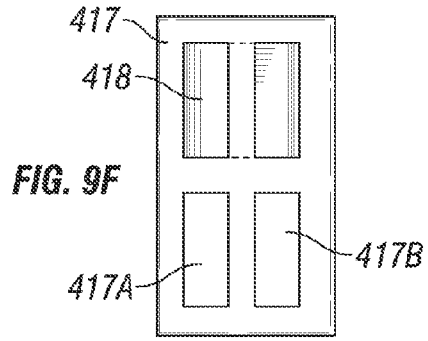
FIG. 9F is a top view of the insert of FIG. 9E.
Figure 9G:
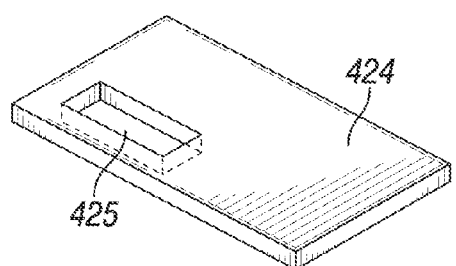
FIG. 9G is a is a perspective view of another insert according to the present invention.
Figure 9H:
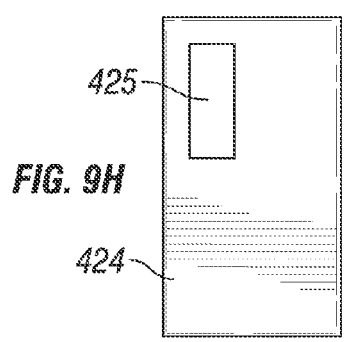
FIG. 9H is a is a top view of the insert of FIG. 9G.

FIGS. 9C and 9D show the shaker 400 in a series flow mode. As shown in FIGS. 9C and 9D, an insert 424 (see FIGS. 9G and 9H) is positioned at the end 412a of the screen 412, replacing the insert 417. Insert 424 blocks the flow of any fluid that may overflow the top end 405a of the weir 405 and enter the channel 409. Fluid flowing from the screen 412 flows down the flowback barrier 414 therebelow, passes through a channel 425 in the insert 424 and then down, via the channel 419 onto the screen 413. As in FIGS. 9A and 9B, pneumoseal apparatuses 400p, 400s hold screens and inserts in place.

Figure 10A:
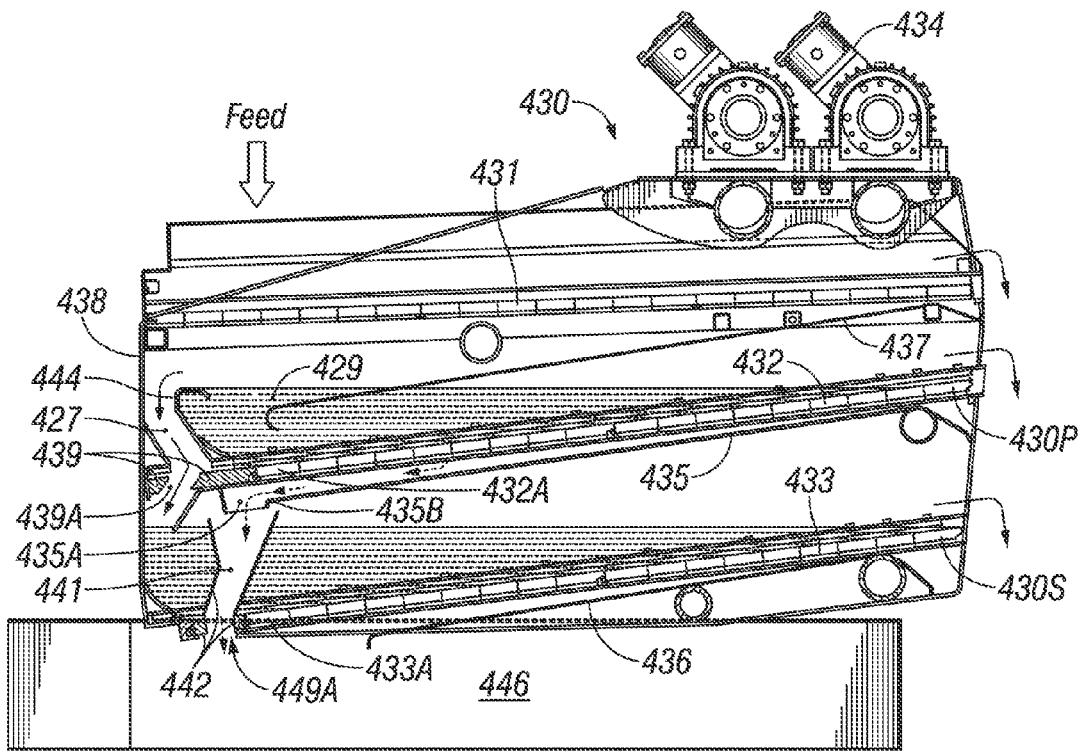
FIG. 10A is a side cross-sectional view of a shale shaker according to the present invention.
Figure 10B:
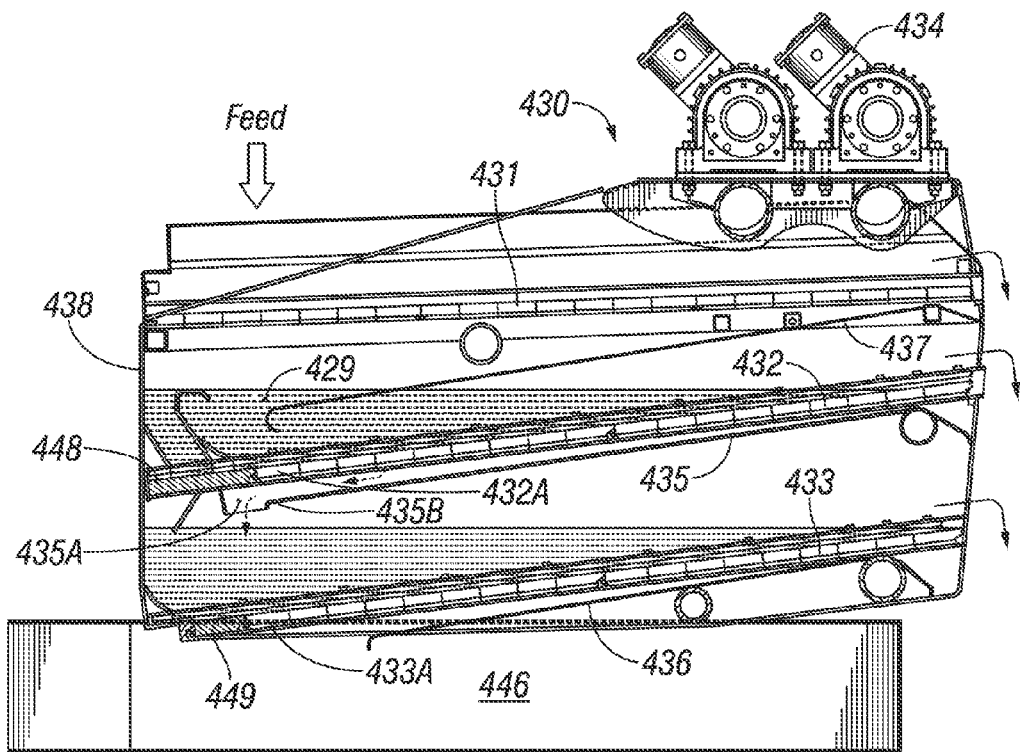
FIG. 10B is a side cross-sectional view of a shale shaker according to the present invention.

FIGS. 10A and 10B show a shale shaker 430, in parallel flow mode in FIG. 10A and in series flow mode in FIG. 10B. The shale shaker 430 has a basket 438 vibrated by a vibratory apparatus 434. A flowback barrier 437 is below a screen 431; a flowback barrier 435 is below a screen 432; and a flowback barrier 436 is below a screen 433. The flowback barrier 435 has a channel 435a in an end 435b. Pneumoseal apparatuses 430p, 430s hold screens and inserts in place.

Figure 10C:
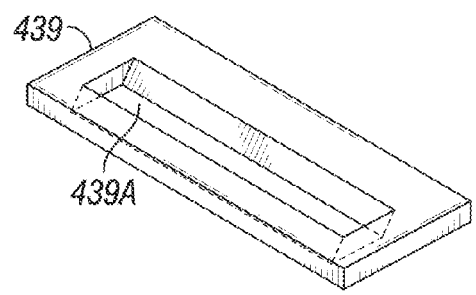
FIG. 10C is a perspective view of an insert according to the present invention.
Figure 10D:
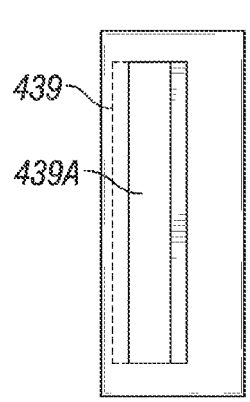
FIG. 10D is a top view of the insert of FIG. 10C.
Figure 10E:
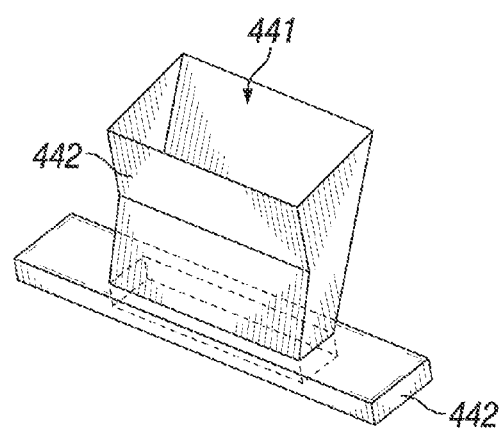
FIG. 10E is a perspective view of a channel apparatus according to the present invention.

Fluid flowing through the screen 431 flows to both the screen 432 and to the screen 433 from a pool 429 on the screen 432, over a weir 444, through a channel 427, and through an opening 439a in an insert 439 (see FIGS. 10C, 10D) positioned at an end 432a of the screen 432. Fluid flowing through the screen 432 flows to a channel 441 of a channel apparatus 442 (see FIG. 10E) positioned at an end 433a of the screen 433 and then to a sump 446. Fluid flowing through the screen 433 flows down to the sump 446.

Figure 10F:
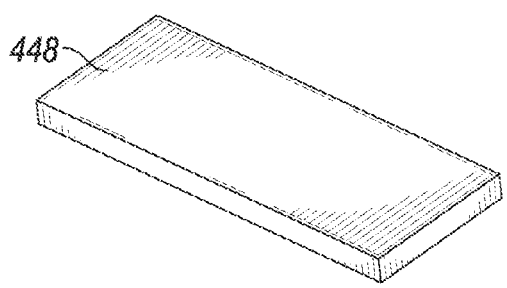
FIG. 10F is a perspective view of an insert according to the present invention.
Figure 10G:
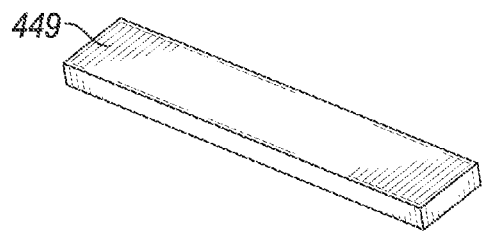
FIG. 10G is a perspective view of an insert according to the present invention.

As shown in FIG. 10B, an insert 448 (see FIG. 10F) is positioned at the end 432a of the screen 432, replacing the insert 439, and blocks flow through the channel 427. Additionally, an insert 449 (see FIG. 10G) is positioned at the end 433a of the screen 433, replacing the channel apparatus 442, and blocks flow through an opening 449a (see FIG. 10A) so that all fluid flowing from the screen 431 flows to the screen 432. Via the opening 435a, all fluid flowing from the screen 432 flows to the screen 433.

Figure 11A:
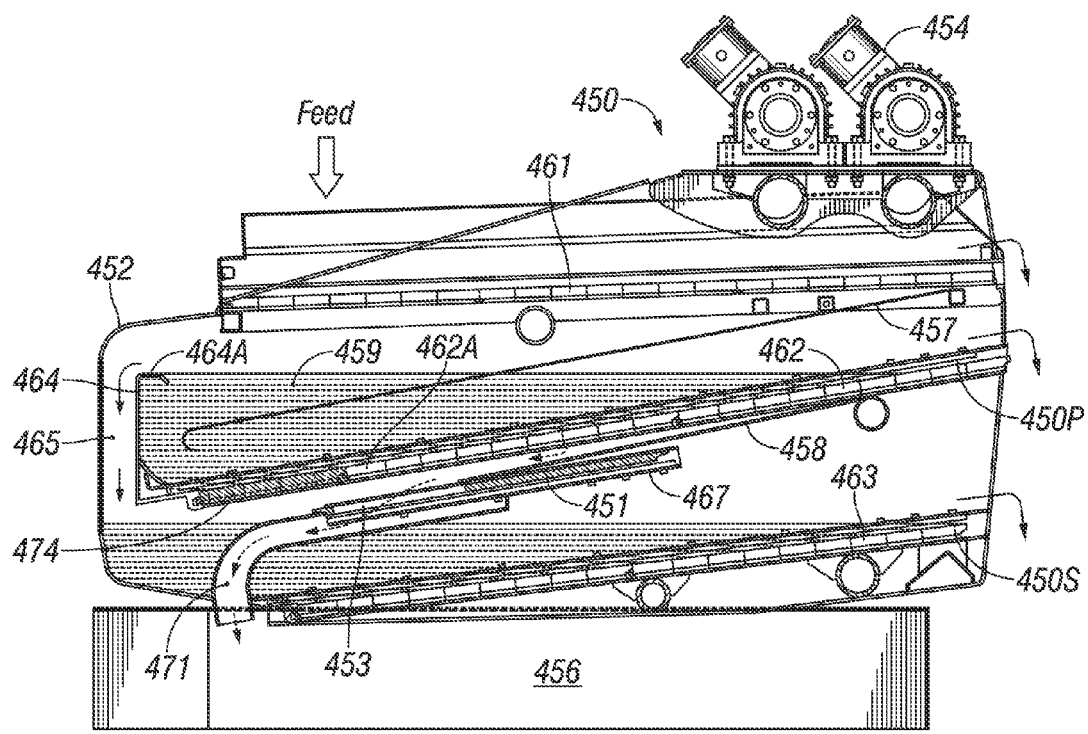
FIG. 11A is a side cross-sectional view of a shale shaker according to the present invention.
Figure 11B:
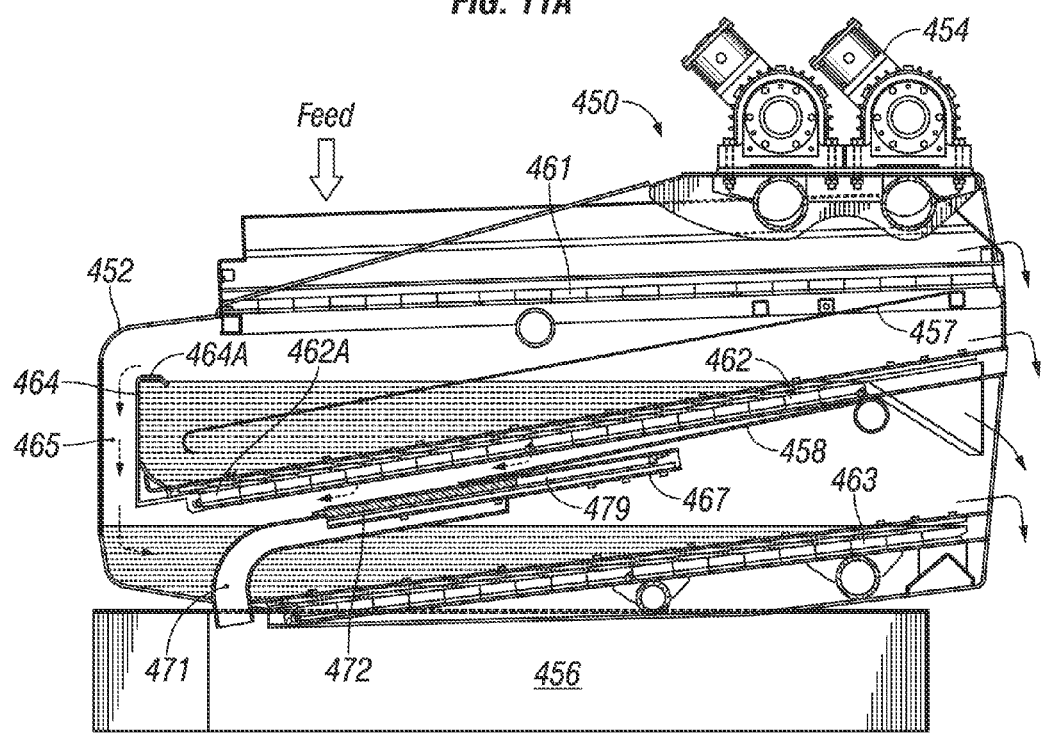
FIG. 11B is a side cross-sectional view of a shale shaker according to the present invention.

FIGS. 11A and 11B show a shale shaker 450 with a basket 452 vibrated by a vibratory apparatus 454. A flowback barrier 457 is beneath a screen 461 and a flowback barrier 458 is beneath a screen 462. Fluid flowing through a screen 463 flows into a sump 456. Pneumoseal apparatuses 450p, 450s hold screens and inserts in place.

Figure 11C:
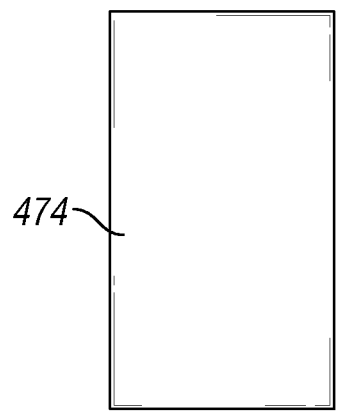
FIG. 11C is a top view of an insert according to the present invention.
Figure 11D:
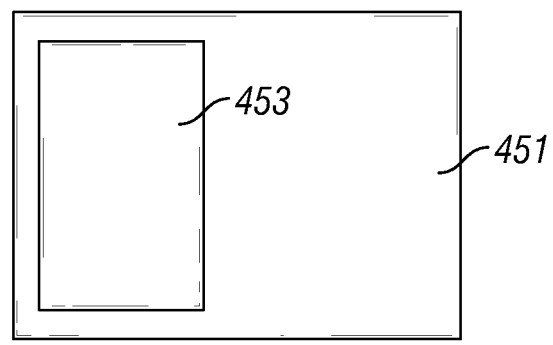
FIG. 11D is a top view of an insert according to the present invention.

Fluid from a pool 459 on the screen 462 overflows a top end 464a of a weir 464, through a channel 465, onto the screen 463 (as shown in FIG. 11A). Fluid flowing through the screen 462 flows through a channel 453 in an insert 451 (see FIG. 11D) and then into the sump 456 (not onto the screen 463). The insert 451 is mounted in a mount 467 and the channel 453 is in fluid communication with a flow channel 471, permitting the fluid flowing through the screen 462 to flow into the channel 471. Thus, the fluid flowing through and then down from the screen 461 flows both to the screen 462 and (over the weir 464) to the screen 463, i.e. in a parallel flow mode. An insert 474 (see FIG. 11C) at the end 462a of the screen 462 holds the screen 462 in such a position that height of the pool 459 makes possible the flow of fluid over the weir 464, so that series or parallel flow can be achieved.

Figure 11E:
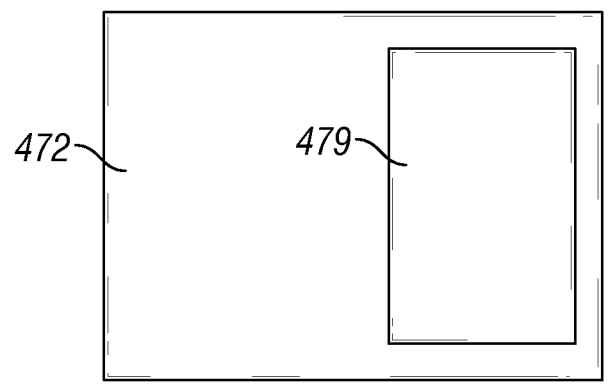
FIG. 11E is a top view of an insert according to the present invention.

FIG. 11B illustrates a series flow mode for the shaker 450. An insert 472 now replaces the insert 451 in the mount 467, and blocks the opening to the channel 471 so that fluid flowing through the screen 462 flows down onto the screen 463 (not directly into the sump 456 through the channel 471). Additionally, the insert 474 has been removed and the screen 462 has been moved down so that the end 462a now occupies the position of the insert 474. Some overflow, if any, from the pond on the screen 462 could flow over the weir 464 down to the screen 463. Optionally a cut-out portion 479 of the insert 472 provides a handle (see FIG. 11E). Furthermore, in other embodiments, the insert 451 may be designed so that when changing the shaker 450 from a parallel flow mode to a series flow mode, the insert 451 may be removed, reversed, and reinstalled so that the channel 453 is no longer positioned above the flow channel 471, and therefore no longer provides fluid communication thereto. Instead, the insert 451 may be designed so as to block the opening to the channel 471, thereby facilitating series flow from the screen 462 to the screen 463, as described above.

Figure 12E:
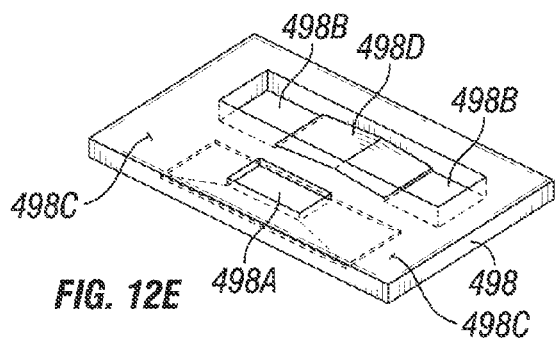
FIG. 12E is a perspective view of an insert according to the present invention.
Figure 12F:
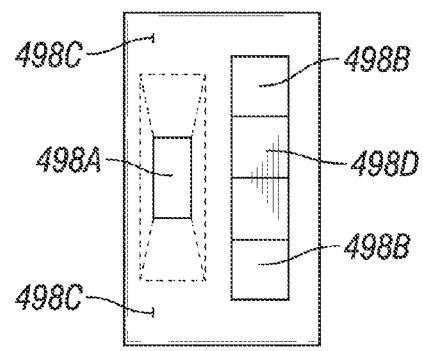
FIG. 12F is a top view of the insert of FIG. 12E.
Figure 12G:
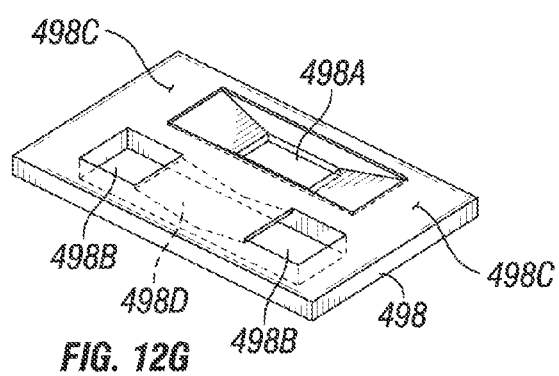
FIG. 12G is another perspective view of the insert of FIG. 12E when viewed from an opposite side of the insert.
Figure 12A:
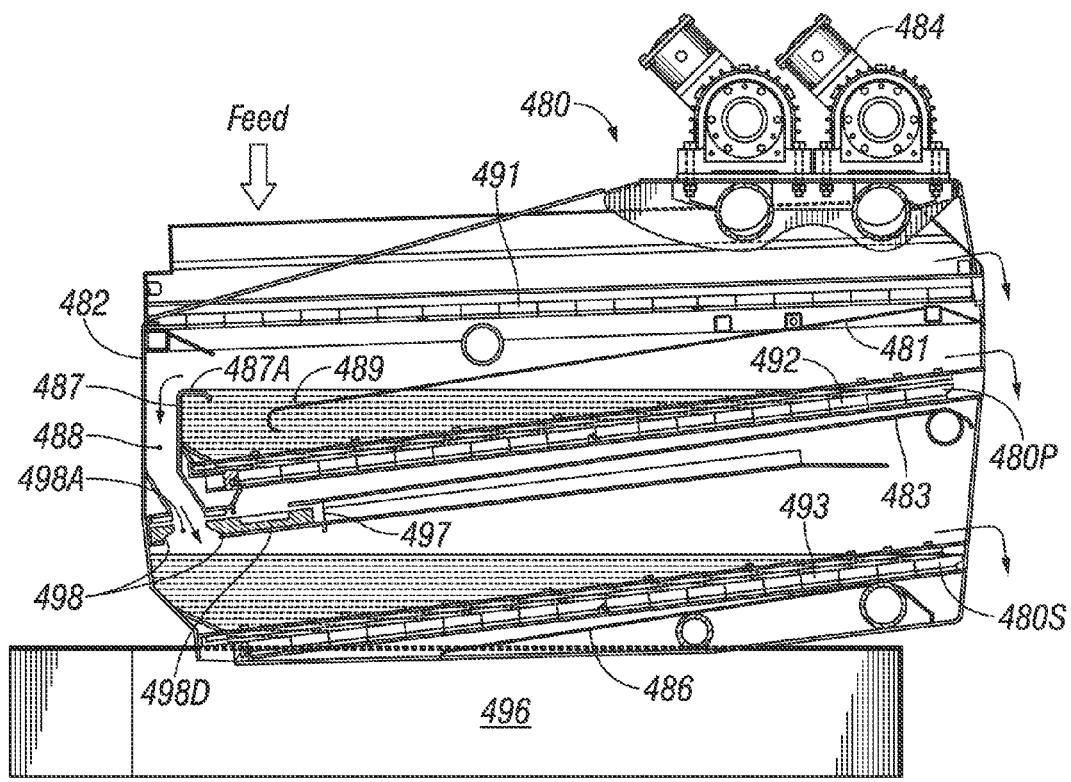
FIG. 12A is a side cross-sectional view of a shale shaker according to the present invention.
Figure 12B:
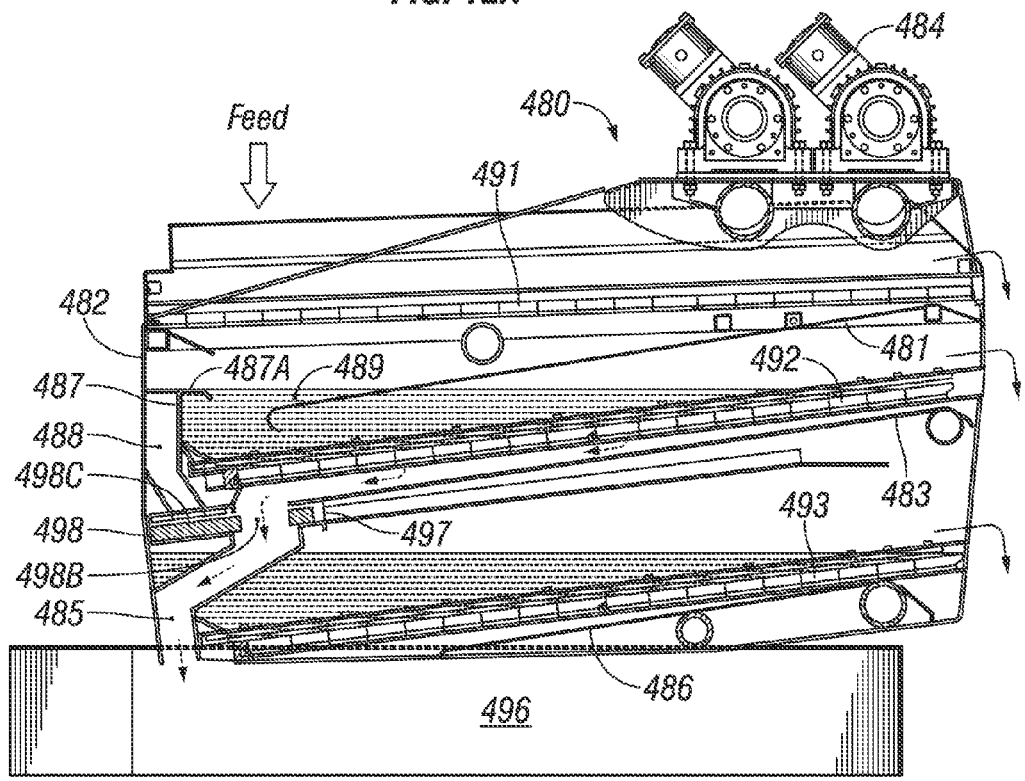
FIG. 12B is a side cross-sectional view of the shale shaker of FIG. 12A.

FIGS. 12A and 12B show the shale shaker 480 with a basket 482 vibrated by vibratory apparatus 484. Fluid flowing through a lowermost screen 493 flows into a sump 496. A flowback barrier 481 is beneath a top screen 491 and a flowback barrier 483 is beneath a middle screen 492. A flowback barrier 486 is beneath the screen 493. Pneumoseal apparatuses 480p, 480s hold screens and inserts in place.

In a parallel flow mode as illustrated in FIGS. 12A, 12B, fluid flowing through the screen 491 flows to both the screen 492 and from a pool 489 on the screen 492 over a top end 487a of a weir 487 via a flow channel 488 down to the screen 493. An insert 498 (see FIGS. 12E, 12F) in a mount 497 has an opening 498a through which fluid from the channel 488 flows to the screen 493. At the same time, fluid from the screen 492 is deflected by a plate portion 498d of the insert 498 and flows through openings 498b to a channel 485 and to the sump 496.

Figure 12C:
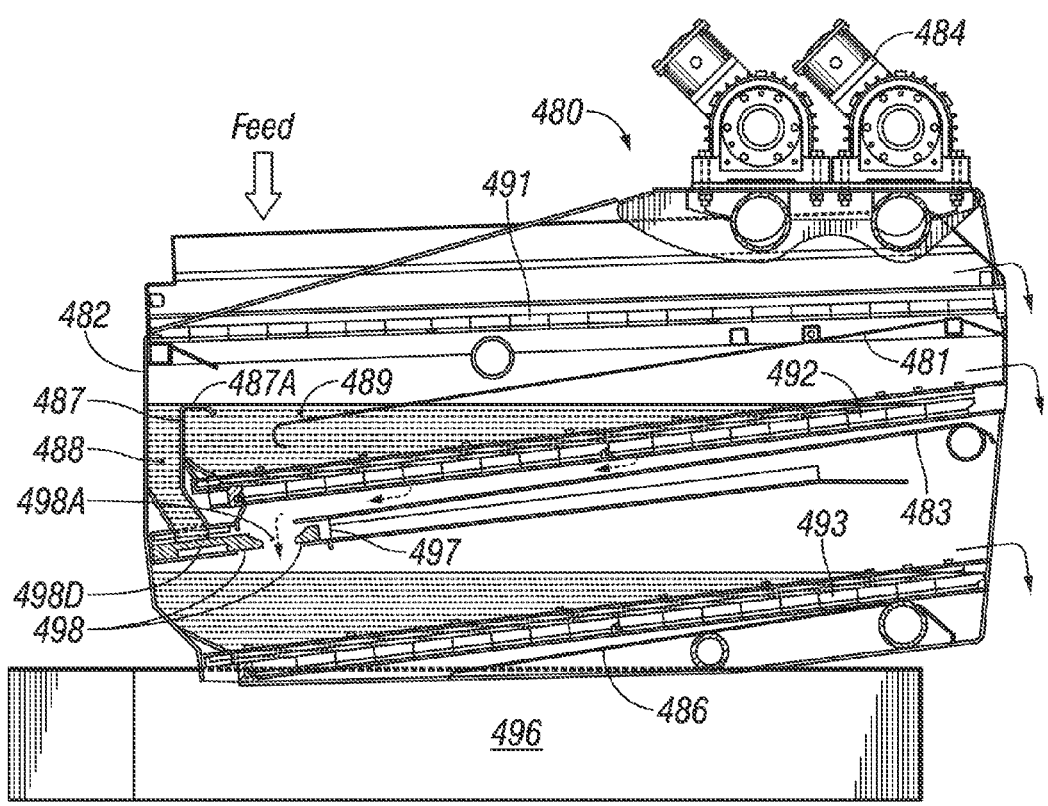
FIG. 12C is a side cross-sectional view of a shale shaker according to the present invention.
Figure 12D:
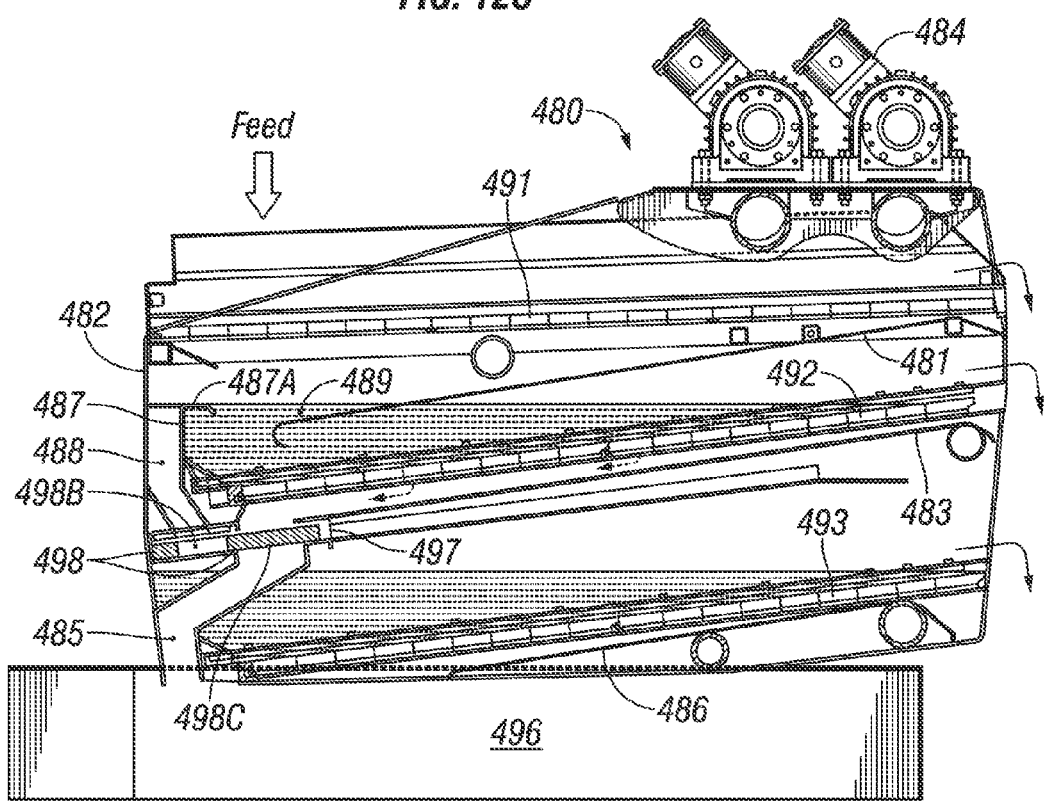
FIG. 12D is a side cross-sectional view of the shale shaker of FIG. 12C.

FIGS. 12C and 12D show the shale shaker 480 in series flow mode. As shown in FIG. 12C, fluid has flowed through the screen 491 down to the screen 492, and the insert 498 has been flipped and rotated in the mount 497 (as shown in FIG. 12G) so that the positions of the openings 498a and 498b relative to the flow channels 488 and 485, respectively, have been reversed. Fluid flowing through the screen 492 flows to the opening 498a in the insert 498 and then down to the screen 493. In the reversed installation of the insert 498 shown in FIG. 12C, plate portions 498c on either side of the opening 498a in the insert 498 (see FIG. 12G) can block fluid flow through the channel 485. Similarly, as shown in FIG. 12D, the plate portion 498d between the two openings 498b in the insert 498 can also block fluid flow from the channel 488.

Figure 13E:
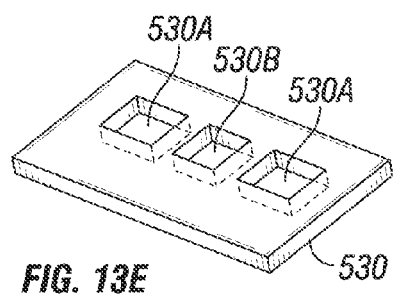
FIG. 13E is a perspective view of an insert according to the present invention.
Figure 13A:
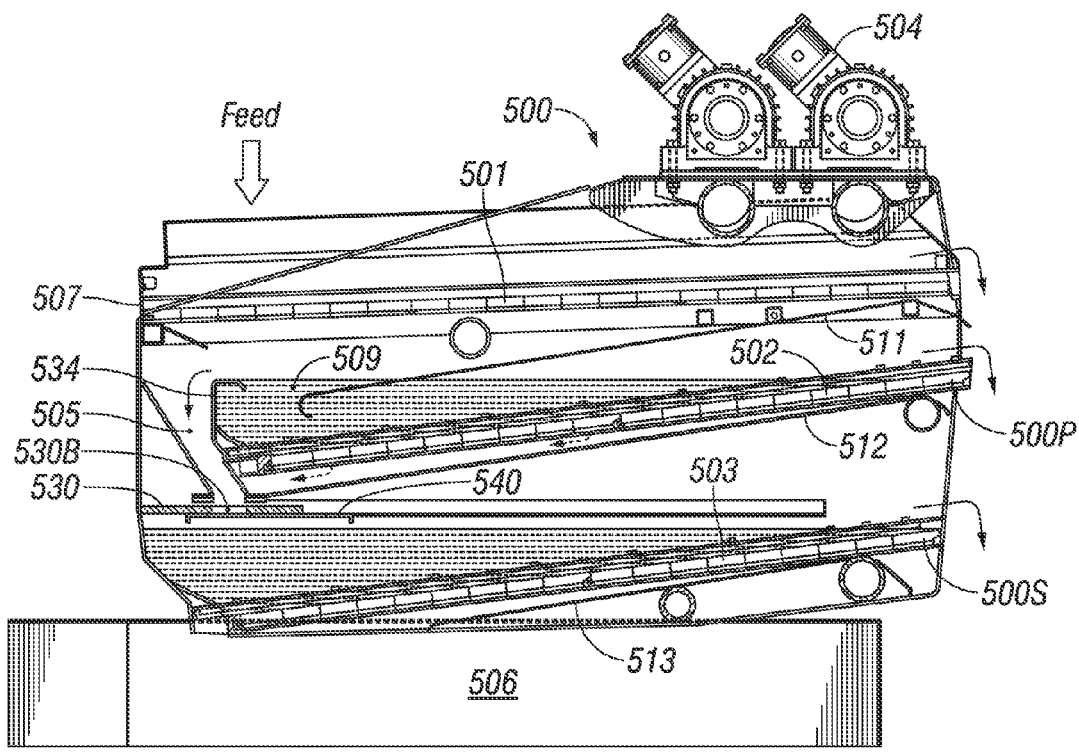
FIG. 13A is a side cross-sectional view of a shale shaker according to the present invention.
Figure 13B:
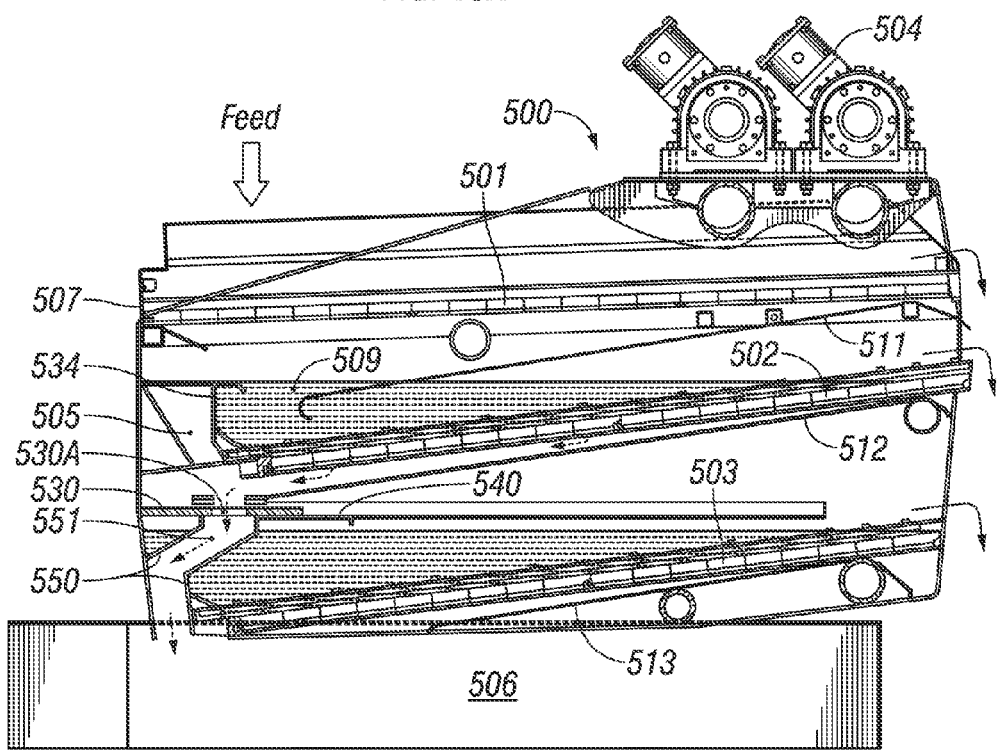
FIG. 13B is a side cross-sectional view of the shale shaker of FIG. 13A.

FIGS. 13A and 13B show a shale shaker 500 in a parallel flow mode. The shaker 500 has a basket 507 and screens 501-503 vibrated by a vibratory apparatus 504. Flowback barriers 511-513 are, respectively, located under the screens 501-503. An insert 530 in a mount 540 is used to change operational mode from series to parallel and vice-versa. Pneumoseal apparatuses 500*p*, 500*s* hold screens in place.

As shown in FIG. 13A fluid from the screen 501 flows both to the screen 502 and to the screen 503 (from a pool 509 on the screen 502, over a weir 534, through a channel 505, and through an opening 530*b* in the insert 530). As shown in FIG. 13B fluid from the screen 502 flows to the sump 506 (down the flowback barrier 512, through openings 530*a* in the insert 530, to a channel 551 of a channel apparatus 550, and to the sump 506). Fluid from the screen 503 flows down the flowback barrier 513 to the sump 506.

Figure 13C:
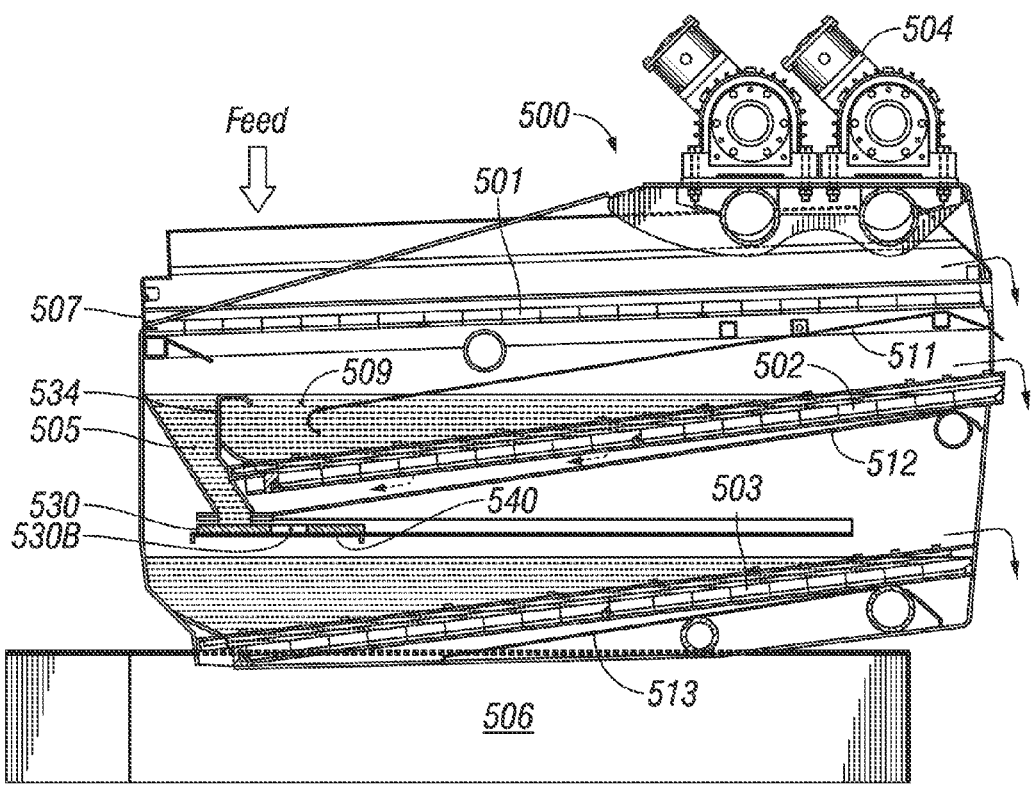
FIG. 13C is a side cross-sectional view of a shale shaker according to the present invention.
Figure 13D:
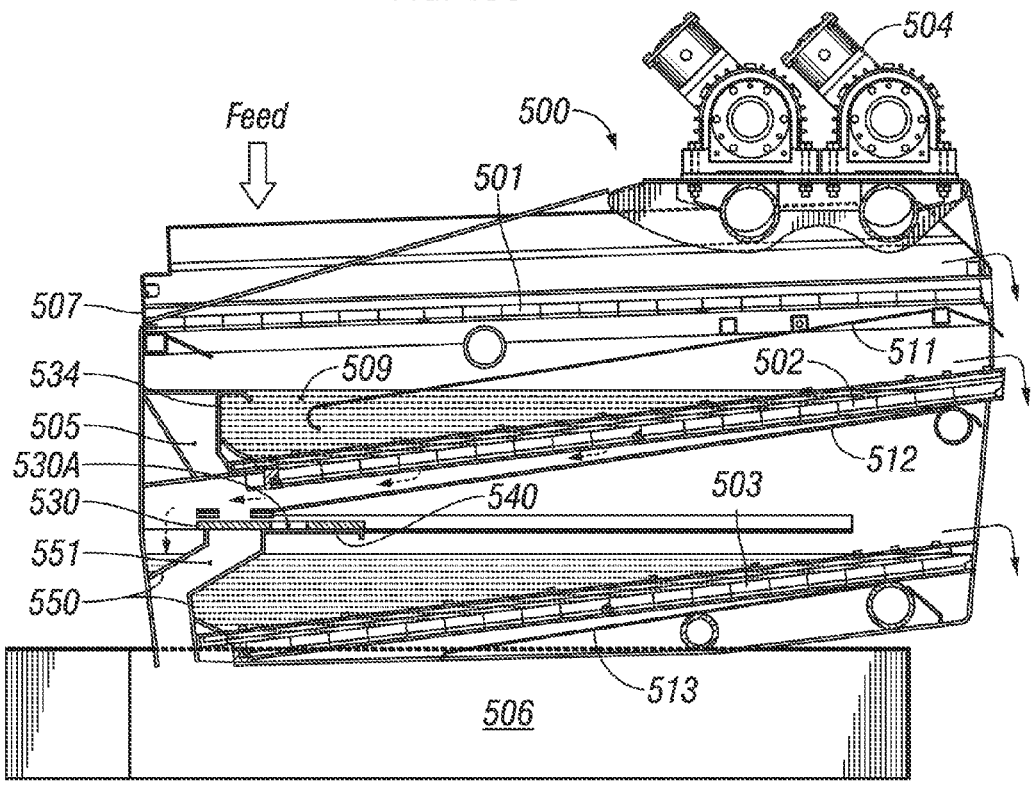
FIG. 13D is a side cross-sectional view of the shale shaker of FIG. 13C.

FIGS. 13C and 13D illustrate the shaker 500 in a series flow mode. As shown in FIG. 13C, the insert 530 (turned around) has been moved forward in the mount 540 so that the opening 530*b* is no longer aligned with the channel 505, and the openings 530*a* are no longer aligned with the channel 551. In this position, the insert 530 blocks fluid flow from the channel 505 so that only the screen 502 receives the fluid flowing from the screen 501. The insert 530 also blocks fluid flow through the channel 551 so that all the fluid flowing from the screen 502 flows to the screen 503.

As shown in FIG. 13E, the insert 530 has openings 530*a* (for flow from screen 502 to the channel 551) and an opening 530*b* (for flow from the pool 509 through the channel 505) to facilitate operation of the shale shaker 500 in a parallel flow mode.

Any screen assembly, any diverter, any pair of screen assemblies, and/or any insert according to the present invention (including, without limitation those of FIGS. 6A-13E) may be used with any shaker or system according to the present invention disclosed herein.

The present invention, therefore, provides in at least certain embodiments, a system for processing a mixture of drilling fluid and solid material to separate at least one component of the mixture by size from the mixture, the system including: a vibratable basket for receiving an input flow of drilling fluid with solids therein; a plurality of spaced-apart screen assemblies including a first screen assembly and a second screen assembly positioned below the first screen assembly; the screen assemblies mounted in the vibratable basket and vibratable therewith; conversion apparatus associated with the screen assemblies for selectively controlling the input flow to select one of series flow and parallel flow to the screen assemblies; drilling fluid flowable through the first screen assembly; and drilling fluid flowable through the second screen assembly and flowable down therefrom. Such a system may one or some, in any possible combination, of the following: a system flow channel between the first screen assembly and the second screen assembly, the conversion apparatus including holding structure above the second screen assembly, a diverter held by the holding structure, the diverter having a diverter channel therethrough through which fluid is flowable from the first screen assembly through the system flow channel down to the second screen assembly for series flow of the input flow from the first screen assembly to the second screen assembly, a weir adjacent the first screen assembly forming a barrier to facilitate maintenance of a pool of drilling fluid and solids on the first screen assembly, and the diverter having a blocking portion, the diverter movable to block flow through the system channel so that the pool rises and drilling fluid with solids bypasses the first screen assembly and flows to the second screen assembly for parallel flow of the input flow to both screen assemblies; the holding structure having spaced-apart rails and having an end opening, and the diverter located between the rails and having handle apparatus at the end opening, the handle apparatus accessible for moving the diverter with respect to the system flow channel; flowback apparatus beneath the first screen assembly for directing flow passing through the first screen assembly to the system flow channel; a sump beneath the second screen assembly for receiving flow passing through the screen assemblies; a parallel flow channel adjacent the screen assemblies for directing flow from the pool to the second screen assembly bypassing the first screen assembly during parallel flow of the system; holding structure above the second screen assembly, and clamping apparatus for holding the diverter in the holding structure; wherein the first screen assembly includes a scalping screen; wherein the second screen assembly includes a screen with second screen mesh of a size suitable for removing solids the size of lost circulation material; a system flow channel between the first screen assembly and the second screen assembly through which fluid is flowable from the first screen assembly to the second screen assembly, the conversion apparatus having a body, the body having a blocking portion for blocking flow to the system flow channel to effect system parallel flow of the input flow to both screen assemblies, and the body having a flow duct for receiving flow from the first screen assembly which is flowable through the duct to the second screen assembly for system series flow to the screen assemblies; a duct blocker for blocking flow through the duct; and/or the conversion apparatus having a body, a first flow channel through the body for effecting system parallel flow to the screen assemblies, and a second flow channel through the body for effecting system series flow to the screen assemblies.

The present invention, therefore, provides in at least certain embodiments, a system for processing a mixture of drilling fluid and solid material to separate at least one component of the mixture by size from the mixture, the system including: a vibratable basket for receiving an input flow of drilling fluid with solids therein; a plurality of spaced-apart screen assemblies including a first screen assembly and a second screen assembly positioned below the first screen assembly; the screen assemblies mounted in the vibratable basket and vibratable therewith; conversion apparatus associated with the screen assemblies for selectively controlling the input flow to select one of series flow and parallel flow to the screen assemblies; drilling fluid flowable through the first screen assembly and drilling fluid flowable through the second screen assembly and down therefrom; a system flow channel between the first screen assembly and the second screen assembly; the conversion apparatus having a body, a first flow channel through the body for effecting system parallel flow to the screen assemblies, a second flow channel through the body for effecting system series flow to the screen assemblies; flowback apparatus beneath the first screen assembly for directing flow passing through the first screen assembly to the system flow channel; a sump beneath the second screen assembly for receiving flow passing through the screen assemblies; and a parallel flow channel adjacent the screen assemblies for directing flow from the pool to the second screen assembly bypassing the first screen assembly during parallel flow to the screen assemblies The present invention, therefore, provides in at least certain embodiments, a conversion apparatus for a system for processing a mixture of drilling fluid and solid material to separate at least one component of the mixture from the mixture, the system including a vibratable basket for receiving an input flow of drilling fluid with solids therein, a plurality of spaced-apart screen assemblies including a first screen assembly and a second screen assembly positioned below the first screen assembly, the screen assemblies mounted in the vibratable basket and vibratable therewith, drilling fluid flowable through the first screen assembly and the second screen assembly down therefrom, the conversion apparatus associated with the screen assemblies for selectively controlling the input flow to select one of series flow and parallel flow, the conversion apparatus including: a body, a first flow channel through the body for effecting system parallel flow to the screen assemblies, and a second flow channel through the body for effecting system series flow to the screen assemblies.

The present invention, therefore, provides in at least certain embodiments, a method for treating a flow of drilling fluid with solids, the method including: introducing the flow of drilling fluid with solids to a system for separating at least one component from the flow, the system as any disclosed herein according to the present invention; the method further including: selecting one of a system series flow to screen assemblies of the system or a system parallel flow to the screen assemblies using a conversion apparatus; flowing drilling fluid with solids to the screen assemblies; and screening the flow to each screening assembly. Such a method may one or some, in any possible combination, of the following: wherein the conversion apparatus has a body, a first flow channel through the body for effecting system parallel flow to the screen assemblies, and a second flow channel through the body for effecting system series flow to the screen assemblies, the method further including selecting the first flow channel for system parallel flow or selecting the second flow channel for system series flow; wherein the system further has flowback apparatus beneath the first screen assembly for directing flow passing through the first screen assembly to the system flow channel, the method further including directing flow from the first screen assembly to the system flow channel; wherein the system further has a sump beneath the second screen assembly, the sump receiving flow passing through the screen assemblies; wherein the system further has holding structure above the second screen assembly, and clamping apparatus for holding the diverter in the holding structure, the method further including clamping the diverter with the clamping apparatus; and/or wherein the first screen assembly includes a scalping screen, and wherein the second screen assembly includes a screen with second screen mesh of a second size suitable for removing solids the size of lost circulation material.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps.

It is the express intention of the applicant not to invoke 35 U.S.C. §112, paragraph 6 for any limitations of any of the claims herein, except for those in which the claim expressly uses the words 'means for' together with an associated function. In this document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be one and only one of the elements.

Whereas the present invention has been described in particular relation to the drawings attached hereto, it should be understood that other and further modifications apart from those shown or suggested herein, may be made within the scope and spirit of the present invention.

What is claimed is:

1. A system, comprising:
   a vibratable basket that is adapted to receive a flow of material comprising a mixture of drilling fluid and solids material;
   a first screen assembly and a second screen assembly positioned below said first screen assembly, wherein said first and second screen assemblies are mounted in and vibratable with said vibratable basket, and wherein said first and second screen assemblies are adapted to allow a flow of at least a portion of said drilling fluid to pass therethrough; and
   a flow conversion apparatus that is adapted to selectively control said flow of said material passing through said system so as to generate one of a series flow and a parallel flow to said first and second screen assemblies, wherein said flow conversion apparatus comprises a first removable insert.

2. The system of claim 1, wherein said first removable insert is adapted to be positioned adjacent to a feed end of said first screen assembly.

3. The system of claim 1, wherein said first removable insert is adapted to be positioned between said first and second screen assemblies.

4. The system of claim 1, wherein said flow conversion apparatus further comprises a weir adjacent to said first screen assembly, said weir being adapted to maintain a pool of said mixture of drilling fluid and solids material on said first screen assembly.

5. The system of claim 1, wherein said first removable insert is a reversible insert that is adapted to be positioned in a first reversible configuration during said series flow of said system and is further adapted to be positioned in a second reversible configuration during said parallel flow of said system.

6. The system of claim 5, wherein said reversible insert comprises a first flow channel and a second flow channel, and wherein, in said first reversible configuration, said first reversible insert it adapted to allow material passing through said first screen assembly to flow through said first flow channel to said second screen assembly and, in said second reversible configuration, said first reversible insert is adapted to allow at least a portion of said mixture of drilling fluid and solids material to flow through said first flow channel so as to bypass said first screen assembly and to allow material passing through said first screen assembly to flow through said second flow channel so as to bypass said second screen assembly.

7. The system of claim 1, wherein said first removable insert comprises a blocking portion and a flow channel portion.

8. The system of claim 7, wherein said first removable insert is adapted to generate said series flow through said system, said blocking portion being adapted to block material passing through said first screen assembly from bypassing said second screen assembly, and said flow channel portion being adapted to allow material passing through said first screen assembly to flow to said second screen assembly.

9. The system of claim 7, wherein said first removable insert is adapted to generate said parallel flow through said system, said blocking portion being adapted to cause at least a portion of said mixture of drilling fluid and solids material to bypass said first screen assembly, and said flow channel portion being adapted to allow material passing through said first screen assembly to bypass said second screen assembly.

10. The system of claim 9, wherein said blocking portion comprises a flow channel that is adapted to redirect said at least said portion of said mixture of drilling fluid and solids material to said second screen assembly.

11. The system of claim 1, wherein said flow conversion apparatus further comprises a second removable insert that is adapted to be positioned adjacent to a feed end of said second screen assembly.

12. The system of claim 11, wherein said second removable insert comprises a blocking insert that is adapted to block material passing through said first screen assembly from bypassing said second screen assembly during said series flow of said system.

13. The system of claim 12, wherein said first removable insert is adapted to be removed from said system during said series flow of said system.

14. The system of claim 11, wherein said second removable insert comprises a flow channel insert that is adapted to allow material passing through said first screen assembly to bypass said second screen assembly during said parallel flow of said system.

15. The system of claim 14, wherein said first removable insert comprises a blocking insert that is adapted to cause at least a portion of said mixture of drilling fluid and solids material to bypass said first screen assembly during said parallel flow of said system.

16. The system of claim 14, wherein said first removable insert comprises a flow channel insert that is adapted to allow at least a portion of said mixture of drilling fluid and solids material to bypass said first screen assembly during said parallel flow of said system.

17. A system, comprising:
a vibratable basket that is adapted to receive a flow of material comprising a mixture of drilling fluid and solids material;
a first screen assembly and a second screen assembly positioned below said first screen assembly, wherein said first and second screen assemblies are mounted in and vibratable with said vibratable basket, and wherein said first and second screen assemblies are adapted to allow a flow of at least a portion of said drilling fluid to pass therethrough;
a weir that is adapted to be positioned adjacent to a feed end of said first screen assembly, said weir being adapted to maintain a pool of said material on said first screen assembly; and
a removable flow insert that is reversibly positionable between said first and second screen assemblies, wherein said removable flow insert is adapted to generate a parallel flow of said material through said system when positioned in a first reversible configuration and to generate a series flow of said material through said system when positioned in a second reversible configuration.

18. The system of claim 17, wherein said removable flow insert comprises a first flow channel that is adapted to allow at least a portion of said material to flow therethrough so as to generate at least one of said series flow and said parallel flow.

19. The system of claim 18, wherein said removable flow insert further comprises a second flow channel that is adapted to allow material passing through said first screen assembly to bypass said second screen assembly when said removable flow insert is positioned in second reversible configuration, said first flow channel being adapted to allow material passing through said first screen assembly to flow to said second screen assembly when said removable flow insert is positioned in first reversible configuration.

20. A system, comprising:
a vibratable basket that is adapted to receive a flow of material comprising a mixture of drilling fluid and solids material;
a first screen assembly and a second screen assembly positioned below said first screen assembly, wherein said first and second screen assemblies are mounted in and vibratable with said vibratable basket, and wherein said first and second screen assemblies are adapted to allow a flow of at least a portion of said drilling fluid to pass therethrough;
a weir that is adapted to be positioned adjacent to a feed end of said first screen assembly, said weir being adapted to maintain a pool of said material on said first screen assembly;
a first removable flow insert positioned adjacent to a feed end of said first screen assembly; and
a second removable flow insert positioned adjacent to a feed end of said second screen assembly, wherein said first and second removable flow inserts comprise a flow conversion apparatus that is adapted to generate one of a series flow and a parallel flow of said material to said first and second screen assemblies.

21. The system of claim 20, wherein said first removable flow insert is adapted to be removed and said first screen assembly is adapted to be repositioned when said flow conversion apparatus is configured to generate said series flow of said material.

22. The system of claim 20, wherein said first removable flow insert is adapted cause a portion of said material in said pool of material to bypass said first screen assembly by overflowing said weir and flowing through a flow channel to said second screen assembly when said flow conversion apparatus is configured to generate said series flow of said material.

23. The system of claim 20, wherein said first removable flow insert comprises a flow channel portion that is adapted allow a portion of said material in said pool of material to bypass said first screen assembly and flow to said second screen assembly when said flow conversion apparatus is configured to generate said parallel flow of said material.

24. The system of claim 20, wherein said second removable flow insert is a flow channel apparatus that is adapted to allow material passing through said first screen assembly to bypass said second screen assembly when said flow conversion apparatus is configured to generate said parallel flow of said material.

25. The system of claim 20, wherein said second removable flow insert is a blocking plate that is adapted to prevent material passing through said first screen assembly from bypassing said second screen assembly when said flow conversion apparatus is configured to generate said series flow of said material.

* * * * *